(12) United States Patent
Luka et al.

(10) Patent No.: US 10,955,132 B2
(45) Date of Patent: Mar. 23, 2021

(54) BURNER PANELS INCLUDING DRY-TIP BURNERS, SUBMERGED COMBUSTION MELTERS, AND METHODS

(71) Applicant: JOHNS MANVILLE, Denver, CO (US)

(72) Inventors: Michael William Luka, Littleton, CO (US); John Wayne Baker, Golden, CO (US)

(73) Assignee: Johns Manville, Denver, CO (US)

( * ) Notice: Subject to any disclaimer, the term of this patent is extended or adjusted under 35 U.S.C. 154(b) by 341 days.

(21) Appl. No.: 16/027,597

(22) Filed: Jul. 5, 2018

(65) Prior Publication Data
US 2018/0313532 A1    Nov. 1, 2018

Related U.S. Application Data

(62) Division of application No. 14/838,229, filed on Aug. 27, 2015, now Pat. No. 10,041,666.

(51) Int. Cl.
*F23C 3/00* (2006.01)
*C03B 5/167* (2006.01)
(Continued)

(52) U.S. Cl.
CPC ............ *F23C 3/004* (2013.01); *C03B 5/1675* (2013.01); *C03B 5/2356* (2013.01); *F23D 11/12* (2013.01);
(Continued)

(58) Field of Classification Search
CPC ....................................................... F23C 3/004
See application file for complete search history.

(56) References Cited

U.S. PATENT DOCUMENTS

| 1,579,353 A | 4/1926 | Good |
| 1,636,151 A | 7/1927 | Schofield |

(Continued)

FOREIGN PATENT DOCUMENTS

| DE | 36 29 965 A1 | 3/1988 |
| DE | 40 00 358 C2 | 3/1993 |

(Continued)

OTHER PUBLICATIONS

"Gamma Irradiators for Radiation Processing" Booklet, International Atomic Energy Agency, Vienna, Austria.

(Continued)

*Primary Examiner* — Nathaniel Herzfeld
(74) *Attorney, Agent, or Firm* — Robert D. Touslee

(57) ABSTRACT

Combustion burner panels, submerged combustion melters including one or more of the panels, and methods of using the same are disclosed. In certain embodiments, the burner panel includes a panel body having a first major surface defined by a lower fluid-cooled portion of the panel body, and a second major surface defined by an upper non-fluid cooled portion of the panel body. The panel body has at least one through passage extending from the first to the second major surface, the through passages accommodating a set of substantially concentric inner and outer conduits. The inner conduit forms a primary passage for fuel or oxidant, and the outer conduit forms a secondary passage between the outer conduit and the inner conduit for fuel or oxidant. A protective member is associated with each set. The burner panels promote burner life and melter campaign length.

7 Claims, 8 Drawing Sheets

(51) Int. Cl.
    *C03B 5/235*     (2006.01)
    *F23D 11/12*     (2006.01)
    *F23D 11/36*     (2006.01)
    *F23D 14/22*     (2006.01)
    *F23D 14/78*     (2006.01)

(52) U.S. Cl.
    CPC .............. *F23D 11/36* (2013.01); *F23D 14/22* (2013.01); *F23D 14/78* (2013.01)

(56) References Cited

U.S. PATENT DOCUMENTS

| | | |
|---|---|---|
| 1,679,295 A | 7/1928 | Dodge |
| 1,706,857 A | 3/1929 | Mathe |
| 1,716,433 A | 6/1929 | Ellis |
| 1,875,474 A | 9/1932 | McKinley |
| 1,883,023 A | 10/1932 | Slick |
| 1,937,321 A | 11/1933 | Howard |
| 1,944,855 A | 1/1934 | Wadman |
| 1,989,103 A | 1/1935 | McKelvey et al. |
| 2,042,560 A | 6/1936 | Stewart |
| 2,064,546 A | 12/1936 | Kutchka |
| 2,174,533 A | 10/1939 | See et al. |
| 2,183,596 A * | 12/1939 | Trinks .................... F23D 17/00 239/397.5 |
| 2,118,479 A | 1/1940 | McCaskey |
| 2,269,459 A | 1/1942 | Kleist |
| 2,432,942 A | 12/1947 | See et al. |
| 2,455,907 A | 1/1948 | Slayter |
| 2,658,094 A | 11/1953 | Nonken |
| 2,677,003 A | 4/1954 | Arbeit et al. |
| 2,679,749 A | 6/1954 | Poole |
| 2,691,689 A | 10/1954 | Arbeit et al. |
| 2,718,096 A | 9/1955 | Henry et al. |
| 2,773,545 A | 12/1956 | Petersen |
| 2,781,756 A | 2/1957 | Kobe |
| 2,867,972 A | 1/1959 | Holderreed et al. |
| 2,878,644 A | 3/1959 | Fenn |
| 2,890,166 A | 6/1959 | Heinze |
| 2,902,029 A | 9/1959 | Hill |
| 2,981,250 A | 4/1961 | Stewart |
| 3,020,165 A | 2/1962 | Davis |
| 3,056,283 A | 10/1962 | Tiede |
| 3,073,683 A | 1/1963 | Switzer et al. |
| 3,084,392 A | 4/1963 | Labino |
| 3,088,812 A | 5/1963 | Bitterlich et al. |
| 3,104,947 A | 9/1963 | Switzer et al. |
| 3,129,087 A | 4/1964 | Hagy |
| 3,160,578 A | 12/1964 | Saxton et al. |
| 3,165,452 A | 1/1965 | Williams |
| 3,170,781 A | 2/1965 | Keefer |
| 3,174,820 A | 3/1965 | See et al. |
| 3,215,189 A | 11/1965 | Bauer |
| 3,224,855 A | 12/1965 | Plumat |
| 3,226,220 A | 12/1965 | Plumat |
| 3,237,929 A | 3/1966 | Plumat et al. |
| 3,239,325 A | 3/1966 | Roberson et al. |
| 3,241,548 A | 3/1966 | See et al. |
| 3,245,769 A | 4/1966 | Eck et al. |
| 3,248,205 A | 4/1966 | Dolf et al. |
| 3,248,206 A | 4/1966 | Apple et al. |
| 3,260,587 A | 7/1966 | Dolf et al. |
| 3,268,313 A | 8/1966 | Burgman et al. |
| 3,285,834 A | 11/1966 | Guerrieri et al. |
| 3,294,512 A | 12/1966 | Penberthy |
| 3,325,298 A | 6/1967 | Brown |
| 3,375,095 A | 3/1968 | Poole |
| 3,380,463 A | 4/1968 | Trethewey |
| 3,385,686 A | 5/1968 | Plumat et al. |
| 3,402,025 A | 9/1968 | Garrett et al. |
| 3,407,805 A | 10/1968 | Bougard |
| 3,407,862 A | 10/1968 | Mustian, Jr. |
| 3,420,510 A | 1/1969 | Griem |
| 3,421,873 A | 1/1969 | Burgman et al. |
| 3,421,876 A | 1/1969 | Schmidt |
| 3,432,399 A | 3/1969 | Schutt |
| 3,442,633 A | 5/1969 | Perry |
| 3,445,214 A | 5/1969 | Oremesher |
| 3,498,779 A | 3/1970 | Hathaway |
| 3,510,393 A | 5/1970 | Burgman et al. |
| 3,519,412 A | 7/1970 | Olink |
| 3,525,674 A | 8/1970 | Barnebey |
| 3,533,770 A | 10/1970 | Adler et al. |
| 3,547,611 A | 12/1970 | Williams |
| 3,563,683 A | 2/1971 | Hess |
| 3,573,016 A | 3/1971 | Rees |
| 3,592,151 A | 7/1971 | Webber |
| 3,592,623 A | 7/1971 | Shepherd |
| 3,600,149 A | 8/1971 | Chen et al. |
| 3,606,825 A | 9/1971 | Johnson |
| 3,607,209 A | 9/1971 | Lazaridis |
| 3,617,234 A | 11/1971 | Hawkins et al. |
| 3,627,504 A | 12/1971 | Johnson et al. |
| 3,632,335 A | 1/1972 | Womer |
| 3,692,017 A | 9/1972 | Glachant et al. |
| 3,717,139 A | 2/1973 | Guillet et al. |
| 3,738,792 A | 6/1973 | Feng |
| 3,741,656 A | 6/1973 | Shapiro |
| 3,741,742 A | 6/1973 | Jennings |
| 3,746,527 A | 7/1973 | Knavish et al. |
| 3,747,588 A | 7/1973 | Malmin |
| 3,754,879 A | 8/1973 | Phaneuf |
| 3,756,800 A | 9/1973 | Phaneuf |
| 3,763,915 A | 10/1973 | Perry et al. |
| 3,764,287 A | 10/1973 | Brocious |
| 3,771,988 A | 11/1973 | Starr |
| 3,788,832 A | 1/1974 | Nesbitt |
| 3,818,893 A | 6/1974 | Kataoka et al. |
| 3,835,909 A | 9/1974 | Douglas et al. |
| 3,840,002 A | 10/1974 | Douglas et al. |
| 3,856,496 A | 12/1974 | Nesbitt et al. |
| 3,885,945 A | 5/1975 | Rees et al. |
| 3,907,585 A | 9/1975 | Francel et al. |
| 3,913,560 A | 10/1975 | Lazarre et al. |
| 3,929,445 A | 12/1975 | Zippe |
| 3,936,290 A | 2/1976 | Cerutti et al. |
| 3,951,635 A | 4/1976 | Rough |
| 3,976,464 A | 8/1976 | Wardlaw |
| 4,001,001 A | 1/1977 | Knavish et al. |
| 4,004,903 A | 1/1977 | Daman et al. |
| 4,028,083 A | 6/1977 | Patznick et al. |
| 4,083,711 A | 4/1978 | Jensen |
| 4,101,304 A | 7/1978 | Marchand |
| 4,110,098 A | 8/1978 | Mattmuller |
| 4,153,438 A | 5/1979 | Stream |
| 4,185,982 A | 1/1980 | Schwenninger |
| 4,203,761 A | 5/1980 | Rose |
| 4,205,966 A | 6/1980 | Horikawa |
| 4,208,201 A | 6/1980 | Rueck |
| 4,226,564 A | 10/1980 | Takahashi et al. |
| 4,238,226 A | 12/1980 | Sanzenbacher et al. |
| 4,249,927 A | 2/1981 | Fakuzaki et al. |
| 4,270,740 A | 6/1981 | Sanzenbacher et al. |
| 4,282,023 A | 8/1981 | Hammel et al. |
| 4,303,435 A | 12/1981 | Sleighter |
| 4,309,204 A | 1/1982 | Brooks |
| 4,316,734 A | 2/1982 | Spinosa et al. |
| 4,323,718 A | 4/1982 | Buhring et al. |
| 4,349,376 A | 9/1982 | Dunn et al. |
| 4,360,373 A | 11/1982 | Pecoraro |
| 4,397,692 A | 8/1983 | Ramge et al. |
| 4,398,925 A | 8/1983 | Trinh et al. |
| 4,405,351 A | 9/1983 | Sheinkop |
| 4,406,683 A | 9/1983 | Demarest |
| 4,413,882 A | 11/1983 | Bailey et al. |
| 4,424,071 A | 1/1984 | Steitz et al. |
| 4,432,780 A | 2/1984 | Propster et al. |
| 4,455,762 A | 6/1984 | Saeman |
| 4,461,576 A | 7/1984 | King |
| 4,488,537 A | 12/1984 | Laurent |
| 4,508,970 A | 4/1985 | Ackerman |
| 4,539,034 A | 9/1985 | Hanneken |
| 4,542,106 A | 9/1985 | Sproull |
| 4,545,800 A | 10/1985 | Won et al. |

(56) References Cited

U.S. PATENT DOCUMENTS

| | | |
|---|---|---|
| 4,549,896 A | 10/1985 | Streicher et al. |
| 4,599,100 A | 7/1986 | Demarest |
| 4,600,425 A * | 7/1986 | Krumwiede .......... B22D 1/005 65/134.5 |
| 4,622,007 A | 11/1986 | Gitman |
| 4,626,199 A | 12/1986 | Bounini |
| 4,632,687 A | 12/1986 | Kunkle et al. |
| 4,634,461 A | 1/1987 | Demarest, Jr. et al. |
| 4,657,586 A | 4/1987 | Masterson et al. |
| 4,718,931 A | 1/1988 | Boettner |
| 4,723,708 A | 2/1988 | Berger et al. |
| 4,735,642 A | 4/1988 | Jensen et al. |
| 4,738,938 A | 4/1988 | Kunkle et al. |
| 4,758,259 A | 7/1988 | Jensen |
| 4,794,860 A | 1/1989 | Welton |
| 4,798,616 A | 1/1989 | Knavish et al. |
| 4,812,372 A | 3/1989 | Kithany |
| 4,814,387 A | 3/1989 | Donat |
| 4,816,056 A | 3/1989 | Tsai et al. |
| 4,818,265 A | 4/1989 | Krumwiede et al. |
| 4,877,436 A | 10/1989 | Sheinkop |
| 4,877,449 A | 10/1989 | Khinkis |
| 4,878,829 A | 11/1989 | Anderson |
| 4,882,736 A | 11/1989 | Pieper |
| 4,886,539 A | 12/1989 | Gerutti et al. |
| 4,900,337 A | 2/1990 | Zortea et al. |
| 4,919,700 A | 4/1990 | Pecoraro et al. |
| 4,927,886 A | 5/1990 | Backderf et al. |
| 4,932,035 A | 6/1990 | Pieper |
| 4,953,376 A | 9/1990 | Merlone |
| 4,963,731 A | 10/1990 | King |
| 4,969,942 A | 11/1990 | Schwenninger et al. |
| 4,973,346 A | 11/1990 | Kobayashi et al. |
| 5,011,086 A | 4/1991 | Sonnleitner |
| 5,032,230 A | 7/1991 | Shepherd |
| 5,052,874 A | 10/1991 | Johanson |
| 5,062,789 A | 11/1991 | Gitman |
| 5,097,802 A | 3/1992 | Clawson |
| 5,168,109 A | 12/1992 | Backderf et al. |
| 5,169,424 A | 12/1992 | Grinnen et al. |
| 5,194,747 A | 3/1993 | Culpepper et al. |
| 5,199,866 A | 4/1993 | Joshi et al. |
| 5,204,082 A | 4/1993 | Schendel |
| 5,299,929 A | 4/1994 | Yap |
| 5,360,171 A | 11/1994 | Yap |
| 5,374,595 A | 12/1994 | Dumbaugh et al. |
| 5,405,082 A | 4/1995 | Brown et al. |
| 5,412,882 A | 5/1995 | Zippe et al. |
| 5,449,286 A | 9/1995 | Snyder et al. |
| 5,473,885 A | 12/1995 | Hunter, Jr. et al. |
| 5,483,548 A | 1/1996 | Coble |
| 5,490,775 A | 2/1996 | Joshi et al. |
| 5,522,721 A | 6/1996 | Drogue et al. |
| 5,545,031 A | 8/1996 | Joshi et al. |
| 5,575,637 A | 11/1996 | Slavejkov et al. |
| 5,586,999 A | 12/1996 | Kobayashi |
| 5,595,703 A | 1/1997 | Swaelens et al. |
| 5,606,965 A | 3/1997 | Panz et al. |
| 5,613,994 A | 3/1997 | Muniz et al. |
| 5,615,668 A | 4/1997 | Panz et al. |
| 5,636,623 A | 6/1997 | Panz et al. |
| 5,672,827 A | 9/1997 | Jursich |
| 5,713,668 A | 2/1998 | Lunghofer et al. |
| 5,718,741 A | 2/1998 | Hull et al. |
| 5,724,901 A | 3/1998 | Guy et al. |
| 5,736,476 A | 4/1998 | Warzke et al. |
| 5,743,723 A | 4/1998 | Iatrides et al. |
| 5,765,964 A | 6/1998 | Calcote et al. |
| 5,814,121 A | 9/1998 | Travis |
| 5,829,962 A | 11/1998 | Drasek et al. |
| 5,833,447 A | 11/1998 | Bodelin et al. |
| 5,849,058 A | 12/1998 | Takeshita et al. |
| 5,863,195 A | 1/1999 | Feldermann |
| 5,887,978 A | 3/1999 | Lunghofer et al. |
| 5,941,459 A * | 8/1999 | Brooker .................. C10J 3/485 239/397.5 |
| 5,944,507 A | 8/1999 | Feldermann |
| 5,944,864 A | 8/1999 | Hull et al. |
| 5,954,498 A | 9/1999 | Joshi et al. |
| 5,975,886 A | 11/1999 | Phillippe |
| 5,979,191 A | 11/1999 | Jian |
| 5,984,667 A | 11/1999 | Phillippe et al. |
| 5,993,203 A | 11/1999 | Koppang |
| 6,029,910 A | 2/2000 | Joshi et al. |
| 6,036,480 A | 3/2000 | Hughes et al. |
| 6,039,787 A | 3/2000 | Edlinger |
| 6,044,667 A | 4/2000 | Chenoweth |
| 6,045,353 A | 4/2000 | VonDrasek et al. |
| 6,068,468 A | 5/2000 | Phillipe et al. |
| 6,071,116 A | 6/2000 | Phillipe et al. |
| 6,074,197 A | 6/2000 | Phillippe |
| 6,077,072 A | 6/2000 | Marin et al. |
| 6,085,551 A | 7/2000 | Pieper et al. |
| 6,109,062 A | 8/2000 | Richards |
| 6,113,389 A | 9/2000 | Joshi et al. |
| 6,116,896 A | 9/2000 | Joshi et al. |
| 6,120,889 A | 9/2000 | Turner et al. |
| 6,123,542 A | 9/2000 | Joshi et al. |
| 6,126,438 A | 10/2000 | Joshi et al. |
| 6,154,481 A | 11/2000 | Sorg et al. |
| 6,156,285 A | 12/2000 | Adams et al. |
| 6,171,100 B1 | 1/2001 | Joshi et al. |
| 6,178,777 B1 | 1/2001 | Chenoweth |
| 6,183,848 B1 | 2/2001 | Turner et al. |
| 6,210,151 B1 | 4/2001 | Joshi et al. |
| 6,210,703 B1 | 4/2001 | Novich |
| 6,237,369 B1 | 5/2001 | LeBlanc et al. |
| 6,241,514 B1 | 6/2001 | Joshi et al. |
| 6,244,197 B1 | 6/2001 | Coble |
| 6,244,857 B1 | 6/2001 | VonDrasek et al. |
| 6,247,315 B1 | 6/2001 | Marin et al. |
| 6,250,136 B1 | 6/2001 | Igreja |
| 6,250,916 B1 | 6/2001 | Phillipe et al. |
| 6,274,164 B1 | 8/2001 | Novich |
| 6,276,924 B1 | 8/2001 | Joshi et al. |
| 6,276,928 B1 | 8/2001 | Joshi et al. |
| 6,293,277 B1 | 9/2001 | Panz et al. |
| 6,314,760 B1 | 11/2001 | Chenoweth |
| 6,314,896 B1 | 11/2001 | Marin et al. |
| 6,332,339 B1 | 12/2001 | Kawaguchi et al. |
| 6,338,337 B1 | 1/2002 | Panz et al. |
| 6,339,610 B1 | 1/2002 | Hoyer et al. |
| 6,344,747 B1 | 2/2002 | Lunghofer et al. |
| 6,357,264 B1 | 3/2002 | Richards |
| 6,386,271 B1 | 5/2002 | Kawamoto et al. |
| 6,418,755 B2 | 7/2002 | Chenoweth |
| 6,422,041 B1 | 7/2002 | Simpson et al. |
| 6,454,562 B1 | 9/2002 | Joshi et al. |
| 6,460,376 B1 | 10/2002 | Jeanvoine et al. |
| 6,536,238 B2 | 3/2003 | Kawaguchi et al. |
| 6,536,651 B2 | 3/2003 | Ezumi et al. |
| 6,558,606 B1 | 5/2003 | Kulkarni et al. |
| 6,578,779 B2 | 6/2003 | Dion |
| 6,660,106 B1 | 12/2003 | Babel et al. |
| 6,694,791 B1 | 2/2004 | Johnson et al. |
| 6,701,617 B2 | 3/2004 | Li et al. |
| 6,701,751 B2 | 3/2004 | Arechaga et al. |
| 6,705,118 B2 | 3/2004 | Simpson et al. |
| 6,708,527 B1 | 3/2004 | Ibarlucea et al. |
| 6,711,942 B2 | 3/2004 | Getman et al. |
| 6,715,319 B2 | 4/2004 | Barrow et al. |
| 6,722,161 B2 | 4/2004 | LeBlanc |
| 6,736,129 B1 | 5/2004 | Sjith |
| 6,739,152 B2 | 5/2004 | Jeanvoine et al. |
| 6,796,147 B2 | 9/2004 | Borysowicz et al. |
| 6,797,351 B2 | 9/2004 | Kulkarni et al. |
| 6,854,290 B2 | 2/2005 | Hayes et al. |
| 6,857,999 B2 | 2/2005 | Jeanvoine |
| 6,883,349 B1 | 4/2005 | Jeanvoine |
| 6,918,256 B2 | 7/2005 | Gutmark et al. |
| 7,027,467 B2 | 4/2006 | Baev et al. |
| 7,116,888 B1 | 10/2006 | Aitken et al. |
| 7,134,300 B2 | 11/2006 | Hayes et al. |

(56) References Cited

U.S. PATENT DOCUMENTS

| | | |
|---|---|---|
| 7,168,395 B2 | 1/2007 | Engdahl |
| 7,175,423 B1 | 2/2007 | Pisano et al. |
| 7,231,788 B2 | 6/2007 | Karetta et al. |
| 7,273,583 B2 | 9/2007 | Rue et al. |
| 7,330,634 B2 | 2/2008 | Aitken et al. |
| 7,383,698 B2 | 6/2008 | Ichinose et al. |
| 7,392,668 B2 | 7/2008 | Adams et al. |
| 7,428,827 B2 | 9/2008 | Maugendre et al. |
| 7,441,686 B2 | 10/2008 | Odajima et al. |
| 7,448,231 B2 | 11/2008 | Jeanvoine et al. |
| 7,454,925 B2 | 11/2008 | DeAngelis et al. |
| 7,509,819 B2 | 3/2009 | Baker et al. |
| 7,565,819 B2 | 7/2009 | Jeanvoine et al. |
| 7,578,988 B2 | 8/2009 | Jacques et al. |
| 7,581,948 B2 | 9/2009 | Borders et al. |
| 7,622,677 B2 | 11/2009 | Barberree et al. |
| 7,624,595 B2 | 12/2009 | Jeanvoine et al. |
| 7,748,592 B2 | 7/2010 | Koga et al. |
| 7,767,606 B2 | 8/2010 | McGinnis et al. |
| 7,778,290 B2 | 8/2010 | Sacks et al. |
| 7,781,562 B2 | 8/2010 | Crawford et al. |
| 7,802,452 B2 | 9/2010 | Borders et al. |
| 7,832,365 B2 | 11/2010 | Hannum et al. |
| 7,845,314 B2 | 12/2010 | Smith |
| 7,855,267 B2 | 12/2010 | Crawford et al. |
| 7,946,136 B2 | 5/2011 | Watkinson |
| 8,033,254 B2 | 10/2011 | Hannum et al. |
| 8,279,899 B2 | 10/2012 | Kitabayashi |
| 8,285,411 B2 | 10/2012 | Hull et al. |
| 8,402,787 B2 | 3/2013 | Pernode et al. |
| 8,424,342 B2 | 4/2013 | Kiefer et al. |
| 8,487,262 B2 | 7/2013 | Damm et al. |
| 8,650,914 B2 | 2/2014 | Charbonneau |
| 8,707,739 B2 | 4/2014 | Huber et al. |
| 8,707,740 B2 | 4/2014 | Huber et al. |
| 8,769,992 B2 | 7/2014 | Huber |
| 8,875,544 B2 | 11/2014 | Charbonneau |
| 8,973,400 B2 | 3/2015 | Charbonneau et al. |
| 8,973,405 B2 | 3/2015 | Charbonneau et al. |
| 8,991,215 B2 | 3/2015 | Shock et al. |
| 8,997,525 B2 | 4/2015 | Shock et al. |
| 9,021,838 B2 | 5/2015 | Charbonneau et al. |
| 9,032,760 B2 | 5/2015 | Charbonneau et al. |
| 9,096,452 B2 | 8/2015 | Charbonneau et al. |
| 9,096,453 B2 | 8/2015 | Charbonneau |
| 2001/0039813 A1 | 11/2001 | Simpson et al. |
| 2002/0086077 A1 | 7/2002 | Noller et al. |
| 2002/0124598 A1 | 9/2002 | Borysowicz et al. |
| 2002/0134112 A1 | 9/2002 | Barrow et al. |
| 2002/0152770 A1 | 10/2002 | Becher et al. |
| 2002/0162358 A1 | 11/2002 | Jeanvoine et al. |
| 2002/0166343 A1 | 11/2002 | LeBlanc |
| 2003/0000250 A1 | 1/2003 | Arechaga et al. |
| 2003/0015000 A1 | 1/2003 | Hayes et al. |
| 2003/0029197 A1 | 2/2003 | Jeanvoine et al. |
| 2003/0037571 A1 | 2/2003 | Kobayashi et al. |
| 2004/0025569 A1 | 2/2004 | Damm et al. |
| 2004/0099009 A1 | 5/2004 | Linz et al. |
| 2004/0128098 A1 | 7/2004 | Neuhaus et al. |
| 2004/0131988 A1 | 7/2004 | Baker et al. |
| 2004/0168474 A1 | 9/2004 | Jeanvoine et al. |
| 2004/0224833 A1 | 11/2004 | Jeanvoine et al. |
| 2005/0039491 A1 | 2/2005 | Maugendre et al. |
| 2005/0061030 A1 | 3/2005 | Ichinose et al. |
| 2005/0083989 A1 | 4/2005 | Leister et al. |
| 2005/0103323 A1 | 5/2005 | Engdal |
| 2005/0236747 A1* | 10/2005 | Rue ................... C03B 5/2356 266/217 |
| 2006/0000239 A1 | 1/2006 | Jeanvoine et al. |
| 2006/0101859 A1 | 5/2006 | Tagaki et al. |
| 2006/0122450 A1 | 6/2006 | Kim et al. |
| 2006/0144089 A1 | 7/2006 | Eichholz et al. |
| 2006/0162387 A1 | 7/2006 | Schmitt et al. |
| 2006/0174655 A1 | 8/2006 | Kobayashi et al. |
| 2006/0177785 A1 | 8/2006 | Varagani et al. |
| 2006/0233512 A1 | 10/2006 | Aitken et al. |
| 2006/0257097 A1 | 11/2006 | Aitken et al. |
| 2006/0287482 A1 | 12/2006 | Crawford et al. |
| 2006/0293494 A1 | 12/2006 | Crawford et al. |
| 2006/0293495 A1 | 12/2006 | Crawford et al. |
| 2007/0051136 A1 | 3/2007 | Watkinson |
| 2007/0106054 A1 | 5/2007 | Crawford et al. |
| 2007/0122332 A1 | 5/2007 | Jacques et al. |
| 2007/0130994 A1 | 6/2007 | Boratav et al. |
| 2007/0137259 A1 | 6/2007 | Borders et al. |
| 2007/0212546 A1 | 9/2007 | Jeanvoine et al. |
| 2007/0220922 A1 | 9/2007 | Bauer et al. |
| 2007/0266737 A1 | 11/2007 | Rodek et al. |
| 2007/0278404 A1 | 12/2007 | Spanke et al. |
| 2008/0035078 A1 | 2/2008 | Li |
| 2008/0227615 A1 | 9/2008 | McGinnis et al. |
| 2008/0256981 A1 | 10/2008 | Jacques et al. |
| 2008/0276652 A1 | 11/2008 | Bauer et al. |
| 2008/0278404 A1 | 11/2008 | Blalock et al. |
| 2008/0293857 A1 | 11/2008 | Crawford et al. |
| 2008/0302136 A1 | 12/2008 | Bauer et al. |
| 2009/0042709 A1 | 2/2009 | Jeanvoine et al. |
| 2009/0044568 A1 | 2/2009 | Lewis |
| 2009/0120133 A1 | 5/2009 | Fraley et al. |
| 2009/0176639 A1 | 7/2009 | Jacques et al. |
| 2009/0220899 A1 | 9/2009 | Spangelo et al. |
| 2009/0235695 A1 | 9/2009 | Pierrot et al. |
| 2009/0320525 A1 | 12/2009 | Johnson |
| 2010/0064732 A1 | 3/2010 | Jeanvoine et al. |
| 2010/0087574 A1 | 4/2010 | Crawford et al. |
| 2010/0089383 A1 | 4/2010 | Cowles |
| 2010/0120979 A1 | 5/2010 | Crawford et al. |
| 2010/0139325 A1 | 6/2010 | Watkinson |
| 2010/0143601 A1 | 6/2010 | Hawtof et al. |
| 2010/0162757 A1 | 7/2010 | Brodie |
| 2010/0227971 A1 | 9/2010 | Crawford et al. |
| 2010/0236323 A1 | 9/2010 | D'Angelico et al. |
| 2010/0242543 A1 | 9/2010 | Ritter et al. |
| 2010/0300153 A1 | 12/2010 | Zhang et al. |
| 2010/0304314 A1 | 12/2010 | Rouchy et al. |
| 2010/0307196 A1 | 12/2010 | Richardson |
| 2010/0313604 A1 | 12/2010 | Watson et al. |
| 2010/0319404 A1 | 12/2010 | Borders et al. |
| 2010/0326137 A1 | 12/2010 | Rouchy et al. |
| 2011/0048125 A1 | 3/2011 | Jackson et al. |
| 2011/0054091 A1 | 3/2011 | Crawford et al. |
| 2011/0061642 A1 | 3/2011 | Rouchy et al. |
| 2011/0088432 A1 | 4/2011 | Purnode et al. |
| 2011/0107670 A1 | 5/2011 | Galley et al. |
| 2011/0236846 A1 | 9/2011 | Rue et al. |
| 2011/0308280 A1 | 12/2011 | Huber |
| 2012/0033792 A1 | 2/2012 | Kulik et al. |
| 2012/0077135 A1 | 3/2012 | Charbonneau |
| 2012/0104306 A1 | 5/2012 | Kamiya et al. |
| 2012/0216567 A1 | 8/2012 | Boughton et al. |
| 2012/0216568 A1 | 8/2012 | Fisher et al. |
| 2012/0216576 A1 | 8/2012 | Boughton et al. |
| 2013/0072371 A1 | 3/2013 | Jansen et al. |
| 2013/0086944 A1 | 4/2013 | Shock et al. |
| 2013/0086949 A1 | 4/2013 | Charbonneau |
| 2013/0086950 A1 | 4/2013 | Huber et al. |
| 2013/0086951 A1 | 4/2013 | Charbonneau et al. |
| 2013/0086952 A1 | 4/2013 | Charbonneau et al. |
| 2013/0123990 A1 | 5/2013 | Kulik et al. |
| 2013/0279532 A1 | 10/2013 | Ohmstede et al. |
| 2013/0283861 A1 | 10/2013 | Mobley et al. |
| 2013/0327092 A1 | 12/2013 | Charbonneau |
| 2014/0007622 A1 | 1/2014 | Shock et al. |
| 2014/0090419 A1 | 4/2014 | Charbonneau et al. |
| 2014/0090422 A1 | 4/2014 | Charbonneau et al. |
| 2014/0090423 A1 | 4/2014 | Charbonneau et al. |
| 2014/0144185 A1 | 5/2014 | Shock et al. |

FOREIGN PATENT DOCUMENTS

| | | |
|---|---|---|
| DE | 44 24 814 A1 | 1/1996 |
| DE | 196 19 919 A1 | 8/1997 |
| DE | 100 29 983 A1 | 1/2002 |
| DE | 100 29 983 C2 | 9/2003 |

(56) References Cited

FOREIGN PATENT DOCUMENTS

| | | |
|---|---|---|
| DE | 10 2005 033330 B3 | 8/2006 |
| EP | 0 181 248 B1 | 10/1989 |
| EP | 1 337 789 B1 | 12/2004 |
| EP | 1 990 321 A1 | 11/2008 |
| EP | 2 133 315 A1 | 12/2009 |
| EP | 2 138 465 A2 | 12/2009 |
| EP | 1 986 966 B1 | 4/2010 |
| EP | 1 667 934 B1 | 2/2011 |
| EP | 2 397 446 A2 | 12/2011 |
| EP | 2 404 880 A1 | 1/2012 |
| EP | 2 433 911 A1 | 3/2012 |
| EP | 2 578 548 A2 | 4/2013 |
| FR | 2 740 860 A1 | 9/1997 |
| GB | 191301772 | 1/1914 |
| GB | 191407633 | 3/1914 |
| GB | 164073 A | 5/1921 |
| GB | 1449439 | 9/1976 |
| IT | 1208172 | 7/1989 |
| JP | S58 199728 A | 11/1983 |
| JP | 2014189429 A | 10/2014 |
| KR | 2000 0050572 A | 8/2000 |
| KR | 100465272 B1 | 12/2004 |
| RO | 114827 | 7/1999 |
| WO | 1998055411 A1 | 12/1998 |
| WO | 2008103291 A1 | 8/2008 |
| WO | 2009091558 A1 | 7/2009 |
| WO | 2010011701 A2 | 1/2010 |
| WO | 2010045196 A3 | 4/2010 |
| WO | 2012048790 A1 | 4/2012 |
| WO | 2014193388 A1 | 4/2014 |
| WO | 2014189506 A1 | 11/2014 |

OTHER PUBLICATIONS

Furman, BJ, ME 120 Experimental Methods Vibration Measurement, San Jose University Department of Mechanical and Aerospace Engineering.

Higley, BA, Glass Melter System Technologies for Vitrification of High-Sodium Content Low-Level, Radioactive, Liquid Wastes—Phase I: SBS Demonstration With Simulated Low-Level Waste—Final Test Report, Westinghouse Hanford Company.

Report for Treating Hanford LAW and WTP SW Simulants: Pilot Plant Mineralizing Flowsheet Apr. 2009, Department of Energy Environmental Management Consolidated Business Center by THOR Treatment Technologies, LLC.

Gerber, J., "Les Densimetres Industriels," Petrole et Techniques, Association Francaise des Techniciens du Petrole, Jun. 1, 1989, pp. 26-27, No. 349, Paris, France.

Rue et al, "Submerged Combustion Melting of Glass," International Journal of Applied Glass Science, Nov. 9, 2011, pp. 262-274, vol. 2, No. 4.

National Laboratory, US DOE contract No. DE-AC09-08SR22470, Oct. 2011.

"AccuTru Temperature Measurement," AccuTru International Corporation, 2003.

"Glass Technologies—The Legacy of a Successful Public-Private Partnership", 2007, U.S. Department of Energy, pp. 1-32.

"Glass Melting Technology—A Technical and Economic Assessment," 2004, U.S. Department of Energy, pp. 1-292.

Muijsenberg, H. P. H., Neff, G., Muller, J., Chmelar, J., Bodi, R. and Matustikj, F. (2008) "An Advanced Control System to Increase Glass Quality and Glass Production Yields Based on GS ESLLI Technology", in A Collection of Papers Presented at the 66th Conference on Glass Problems: Ceramic Engineering and Science Proceedings, vol. 27, Issue 1 (ed W. M. Kriven), John Wiley & Sons, Inc., Hoboken, NJ, USA. doi: 10.1002/9780470291306.ch3.

Rue, "Energy-Efficient Glass Melting—The Next Generation Melter", Gas Technology Institute, Project No. 20621 Final Report (2008).

Muijsenberg, E., Eisenga, M. and Buchmayer, J. (2010) "Increase of Glass Production Efficiency and Energy Efficiency with Model-Based Predictive Control", in 70th Conference on Glass Problems: Ceramic Engineering and Science Proceedings, vol. 31, Issue 1 (ed C. H. Drummond), John Wiley & Sons, Inc., Hoboken, NJ, USA. doi: 10.1002/9780470769843.ch15.

Sims, Richard, "Batch charging technologies—a review", www.glassonweb.com, Nikolaus Sorg Gmbh & Co KG (May 2011).

"Canty Process Technology" brochure, date unknown, Apr. 2012 at American Institute of Chemical Engineers, Spring Meeting, Houston, TX.

"Glass Melting", Battelle PNNL MST Handbook, U.S. Department of Energy, Pacific Northwest Laboratory, retrieved from the Internet Apr. 20, 2012.

"Roll Compaction", brochure from The Fitzpatrick Company, Elmhurst, Illinois, retrieved from the Internet Apr. 20, 2012.

"Glass Industry of the Future", United States Department of Energy, report 02-GA50113-03, pp. 1-17, Sep. 30, 2008.

Stevenson, "Foam Engineering: Fundamentals and Applications", Chapter 16, pp. 336-389, John Wiley & Sons (Mar. 13, 2012).

Clare et al., "Density and Surface Tension of Borate Containing Silicate Melts", Glass Technology—European Journal of Glass Science and Technology, Part A, pp. 59-62, vol. 44, No. 2, Apr. 1, 2003.

Seward, T.P., "Modeling of Glass Making Processes for Improved Efficiency", DE-FG07-96EE41262, Final Report, Mar. 31, 2003.

Conradt et al, Foaming behavior on glass melts, Glastechniche Berichte 60 (1987) Nr. 6, S. 189-201 Abstract Fraunhofer ISC.

Kim et al., "Foaming in Glass Melts Produced by Sodium Sulfate Decomposition under Isothermal Conditions", Journal of the American Ceramic Society, 74(3), pp. 551-555, 1991.

Kim et al., "Foaming in Glass Melts Produced by Sodium Sulfate Decomposition under Ramp Heating Conditions", Journal of the American Ceramic Society, 75(11), pp. 2959-63, 1992.

Kim et al., "Effect of Furnace Atmosphere on E-glass Foaming", Journal of Non-Crystalline Solids, 352(50/51), pp. 5287-95, 2006.

Van Limpt et al., "Modelling the evaporation of boron species. Part 1. Alkali-free borosilicate glass melts", Glass Technology—European Journal of Glass Science and Technology, Part A, 52(3): pp. 77-87, 2011.

Oblain, V.M. et al, "Submerged Combustion Furnace for Glass Melts," Ceramic Engineering and Science Proceedings, Jan. 1, 1996, pp. 84-92, vol. 17—No. 2, American Ceramic Society Inc., US.

* cited by examiner

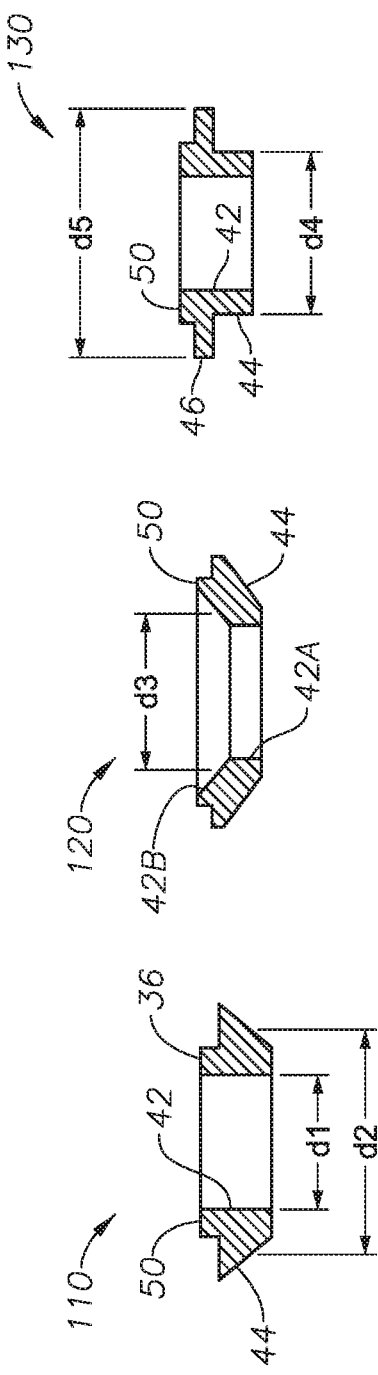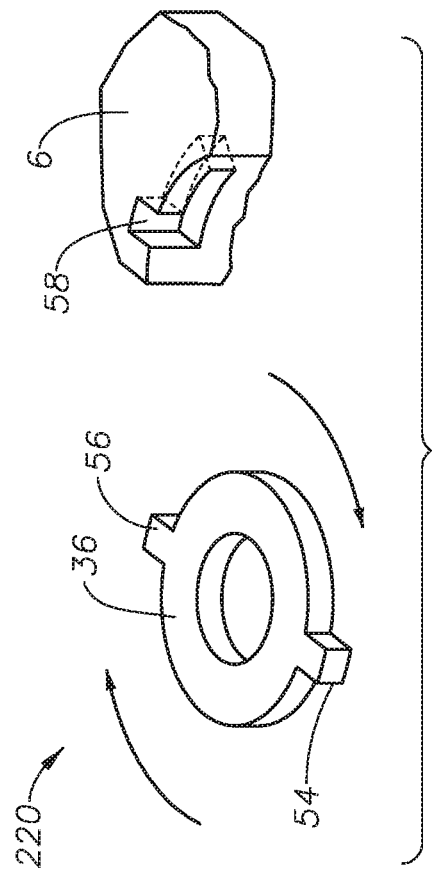

700

702 — Feeding the feedstock into a submerged combustion melter comprising a combustion burner panel comprising:
    (a) a panel body having a first major surface defined by a lower fluid-cooled portion of the panel body, and a second major surface defined by an upper non-fluid cooled portion of the panel body, the panel body having at least one through passage extending from the first to the second major surface, the panel body supporting at least one set of substantially concentric at least one inner conduit and an outer conduit in the through passage, each conduit comprising proximal and distal ends, the at least one inner conduit forming a primary passage and the outer conduit forming a secondary passage between the outer conduit and the at least one inner conduit; and
    (b) a non-fluid cooled protective member associated with each set, each non-fluid cooled protective member supported at least partially internally of the panel body and positioned at the distal end of the outer conduit of each set.

704 — Melting the feedstock.

FIG. 9

BURNER PANELS INCLUDING DRY-TIP BURNERS, SUBMERGED COMBUSTION MELTERS, AND METHODS

CROSS-REFERENCE TO RELATED APPLICATION

This application is a division of prior pending U.S. application Ser. No. 14/838,229 filed Aug. 27, 2015. The entire contents of the above-identified application is herein incorporated by reference for all purposes.

BACKGROUND INFORMATION

Technical Field

The present disclosure relates generally to the field of combustion burners, combustion burner panels, and methods of use, and more specifically to burners, burner panels, submerged combustion melters, and methods of their use, particularly for melting glass-forming materials, mineral wool forming materials, and other non-metallic inorganic materials.

Background Art

A submerged combustion melter (SCM) may be employed to melt glass batch and/or waste glass materials to produce molten glass, or may melt mineral wool feedstock to make mineral or rock wool, by passing oxygen, oxygen-enriched mixtures, or air along with a liquid, gaseous and/or particulate fuel (some of which may be in one or more of the feedstock materials), directly into a molten pool of glass or other material, usually through burners submerged in a turbulent melt pool. The introduction of high flow rates of products of combustion of the oxidant and fuel into the molten material, and the expansion of the gases during submerged combustion (SC), cause rapid melting of the feedstock and much turbulence and foaming.

In the context of SCMs, SC burners are predominately water-cooled, nozzle mix designs and may avoid premixing of oxidant and fuel for safety reasons due to the increased reactivity of using oxygen or oxygen-enriched oxidants as the oxidant versus air. Nevertheless, certain submerged combustion burners employ a smooth exterior surface, half-toroid metallic burner tip of the same or similar material as the remainder of the burner, where the fuel and oxidant begin mixing just after escaping the burner tip. When using such burners in an SCM for the manufacture of glass or other molten materials, the burner tip is placed in an extreme environment. The burner tip may be exposed to corrosive oxidants, fuels, and/or combustion products, high temperature direct contact with molten and/or unmelted materials, internal pressure from water or other coolant, vaporization of coolant within the burner tip, thermal cycling, and the like. As a result, it has been determined that thermal fatigue resistance, high melting point, high temperature corrosion/oxidation resistance, high temperature structural strength, and ability to join/fabricate are some of the key requirements for designing next generation SC burners.

Due to these requirements, noble metal (sometimes referred to as precious metal) alloys have become the focus. However, being expensive alloys, it is not presently economical to fabricate the entire burner using these materials. Because of this, up until now the burner designer was left with the challenge of determining how to best attach the non-noble metal portion of the burner to the noble metal tip without sacrificing other concerns, such as good mechanical strength, coolant leak proofing, and noble metal recovery. It would be an advanced in the submerged combustion melter art to avoid some or all of these issues, and prolong the run-length or campaign length of submerged combustion melters.

SUMMARY

In accordance with the present disclosure, submerged combustion (SC) burner panels are described that may reduce or eliminate problems with known SC burners, melters, and methods of using the melters to produce molten glass and other non-metallic inorganic materials, such as rock wool and mineral wool.

One aspect of this disclosure is a combustion burner panel comprising:
(a) a panel body having a first major surface defined by a lower fluid-cooled portion of the panel body, and a second major surface defined by an upper non-fluid cooled portion of the panel body, the panel body having at least one through passage extending from the first to the second major surface, the panel body supporting at least one set of substantially concentric at least one inner conduit and an outer conduit in the through passage, each conduit comprising proximal and distal ends, the at least one inner conduit forming a primary passage and the outer conduit forming a secondary passage between the outer conduit and the at least one inner conduit; and
(b) a non-fluid cooled protective member associated with each set, each non-fluid cooled protective member supported at least partially internally of the panel body and positioned at the distal end of the outer conduit of each set.

Other burner panel embodiments, such as those including fluid-cooled protective members, and submerged combustion melters (SCM) comprising at least one burner panel of this disclosure, and methods of producing molten non-metallic inorganic materials such as molten glass, in the SCMs, are considered aspects of this disclosure. Certain methods within the disclosure include methods wherein the fuel may be a substantially gaseous fuel selected from the group consisting of methane, natural gas, liquefied natural gas, propane, carbon monoxide, hydrogen, steam-reformed natural gas, atomized oil or mixtures thereof, and the oxidant may be an oxygen stream comprising at least 90 mole percent oxygen.

Burner panels, melters, and methods of the disclosure will become more apparent upon review of the brief description of the drawings, the detailed description of the disclosure, and the claims that follow.

BRIEF DESCRIPTION OF THE DRAWINGS

The manner in which the objectives of the disclosure and other desirable characteristics can be obtained is explained in the following description and attached drawings in which:

FIGS. 3A, 3B, and 3C are schematic cross-sectional views of three non-fluid-cooled protective members in accordance with the present disclosure;

FIG. 4 is a schematic perspective view, partially in phantom, of another non-fluid-cooled protective member in accordance with the present disclosure;

FIG. 9 is a schematic logic diagram of a method of melting non-metallic inorganic materials in accordance with the present disclosure.

Figure 1:
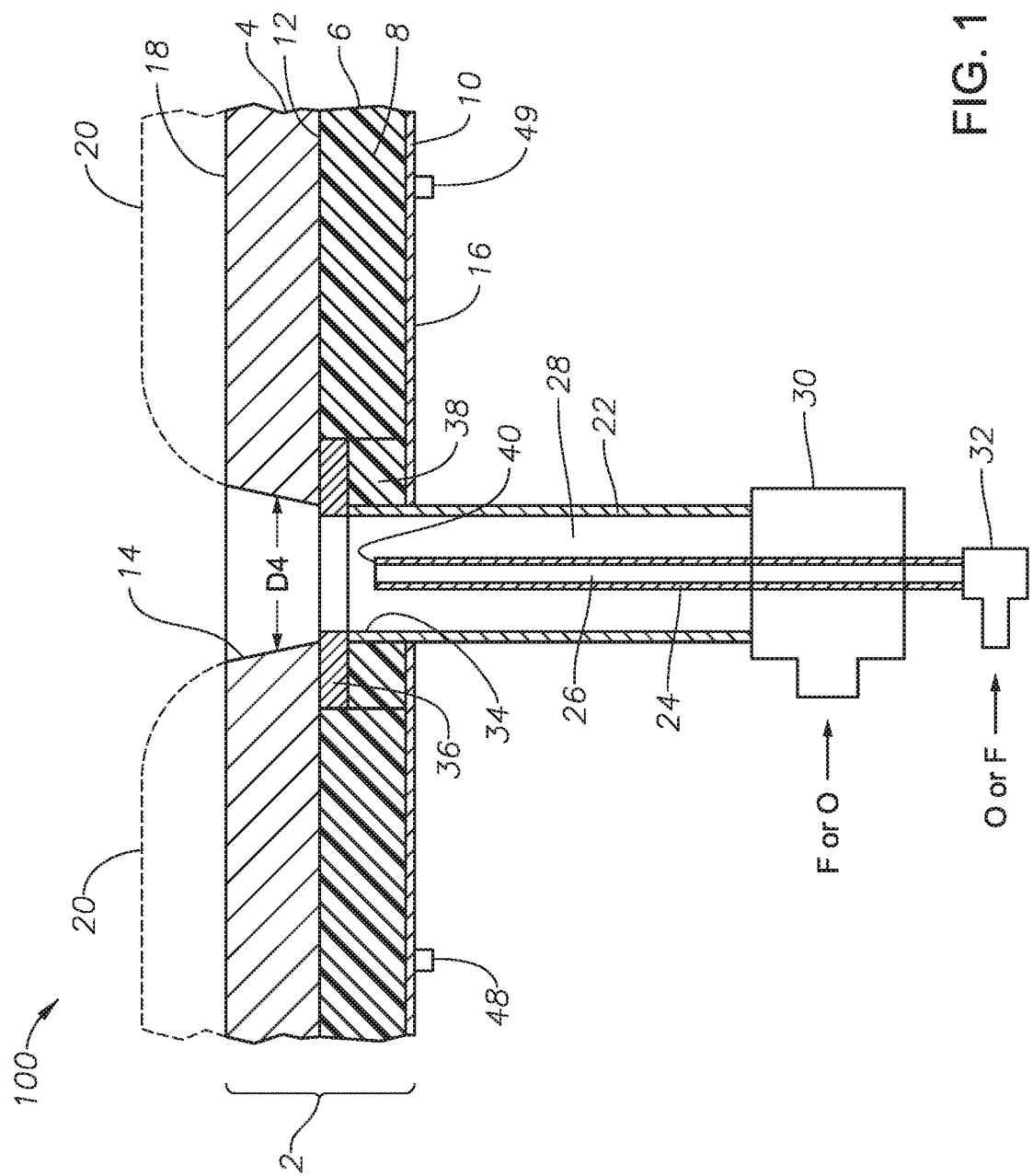
FIGS. 1, 2, 5, 6, and 7 are schematic cross-sectional views of five burner panels in accordance with the present disclosure.

It is to be noted, however, that the appended drawings are schematic in nature, may not be to scale, and illustrate only typical embodiments of this disclosure and are therefore not to be considered limiting of its scope, for the disclosure may admit to other equally effective embodiments.

DETAILED DESCRIPTION

In the following description, numerous details are set forth to provide an understanding of the disclosed SC burner panels, SCMs, and methods. However, it will be understood by those skilled in the art that the apparatus and methods covered by the claims may be practiced without these details and that numerous variations or modifications from the specifically described embodiments may be possible and are deemed within the claims. For example, wherever the term "comprising" is used, embodiments where "consisting essentially of" and "consisting of" are explicitly disclosed herein and are part of this disclosure. All U.S. published patent applications and U.S. patents referenced herein are hereby explicitly incorporated herein by reference. In the event definitions of terms in the referenced patents and applications conflict with how those terms are defined in the present application, the definitions for those terms that are provided in the present application shall be deemed controlling. All percentages herein are based on weight unless otherwise specified.

As explained briefly in the Background, one drawback to present SC burners employing a metallic burner tip of the same or similar material as the remainder of the burner is that, when using such burners in an SCM for the manufacture of glass, the burner tip is placed in an extreme environment. One problem is that the tip of the burner is exposed to the extreme high temperatures of an oxy-gas flame when oxygen-enriched oxidants are used. Such flames, when deflected, can melt the burner tip. Using noble metals and alloys for burner tips presents the additional challenge of attaching the burner tip to the base metal of the remainder of the burner. The present application is devoted to resolving this challenge with a new approach to burner design for submerged combustion.

Various terms are used throughout this disclosure. "Submerged" as used herein means that combustion gases emanate from combustion burners or combustion burner panels under the level of the molten glass; the burners or burner panels may be floor-mounted, wall-mounted, or in melter embodiments comprising more than one submerged combustion burner, any combination thereof (for example, two floor mounted burner panels and one wall mounted burner panel). Burner panels described herein may form part of an SCM floor and/or wall structure. In certain embodiments one or more burner panels described herein may form the entire floor. A "burner panel" is simply a panel equipped to emit fuel and oxidant, or in some embodiments only one of these (for example a burner panel may only emit fuel, while another burner panel emits only oxidant, and vice versa). "SC" as used herein means "submerged combustion" unless otherwise specifically noted, and "SCM" means submerged combustion melter unless otherwise specifically noted.

As used herein the phrase "combustion gases" as used herein means substantially gaseous mixtures comprised primarily of combustion products, such as oxides of carbon (such as carbon monoxide, carbon dioxide), oxides of nitrogen, oxides of sulfur, and water, as well as partially combusted fuel, non-combusted fuel, and any excess oxidant. Combustion products may include liquids and solids, for example soot and unburned liquid fuels.

"Oxidant" as used herein includes air and gases having the same molar concentration of oxygen as air, oxygen-enriched air (air having oxygen concentration greater than 21 mole percent), and "pure" oxygen, such as industrial grade oxygen, food grade oxygen, and cryogenic oxygen. Oxygen-enriched air may have 50 mole percent or more oxygen, and in certain embodiments may be 90 mole percent or more oxygen.

The term "fuel", according to this disclosure, means a combustible composition comprising a major portion of, for example, methane, natural gas, liquefied natural gas, propane, hydrogen, steam-reformed natural gas, atomized hydrocarbon oil, combustible powders and other flowable solids (for example coal powders, carbon black, soot, and the like), and the like. Fuels useful in the disclosure may comprise minor amounts of non-fuels therein, including oxidants, for purposes such as premixing the fuel with the oxidant, or atomizing liquid or particulate fuels. As used herein the term "fuel" includes gaseous fuels, liquid fuels, flowable solids, such as powdered carbon or particulate material, waste materials, slurries, and mixtures or other combinations thereof.

The sources of oxidant and fuel may be one or more conduits, pipelines, storage facility, cylinders, or, in embodiments where the oxidant is air, ambient air. Oxygen-enriched oxidants may be supplied from a pipeline, cylinder, storage facility, cryogenic air separation unit, membrane permeation separator, or adsorption unit such as a vacuum swing adsorption unit.

Burner panels of the present disclosure aim to solve the problem of short life of SC burners. In certain embodiments this may be accomplished by use of burner panels including fluid-cooled or non-fluid-cooled protective members for the external-most conduit of the sets of conduits, thus reducing the exposure of the burner tip to extreme high temperatures as well as reducing the severity of extreme thermal cycling experienced by SC burner tips.

Certain burner panel embodiments may comprise burner panels wherein the outer conduit of at least some of the sets of concentric conduits are oxidant conduits, and the at least one inner conduit is one or more fuel conduits.

Certain burner panel embodiments may comprise non-fluid cooled or fluid-cooled protective members comprising one or more noble metals. Certain burner panel embodiments may comprise non-fluid cooled or fluid-cooled protective members consisting essentially of one or more noble metals. Certain burner panel embodiments may comprise non-fluid cooled or fluid-cooled protective members consisting of one or more noble metals.

Certain burner panel embodiments may comprise those wherein the lower fluid-cooled portion and the upper non-fluid cooled portion are positioned in layers, with the lower fluid-cooled portion supporting the sets of conduits and the associated protective members.

Certain burner panel embodiments may comprise those wherein the non-fluid cooled protective member is a shaped annular disk having a through passage, the through passage of the shaped annular disk having an internal diameter $d_1$ substantially equal to but not larger than an internal diameter D1 of the outer conduit. Certain burner panel embodiments may comprise those wherein an internal surface of the through passage of the shaped annular disk and a portion of a top surface of the shaped annular disk are not engulfed by the fluid-cooled or non-fluid-cooled portions of the panel body.

Certain burner panel embodiments may comprise those wherein the layers of the fluid-cooled and non-fluid-cooled portions form a seam there between, and wherein a top surface of the non-fluid cooled protective member and the seam are at substantially equal distance d6 from a top surface of the non-fluid-cooled portion, and a bottom surface of the protective member is below the seam a distance d7, where d6<d7.

Certain burner panel embodiments may comprise those wherein a portion of the through passage through the non-fluid-cooled portion has an inner surface angled away from a longitudinal axis through the substantially concentric conduits at an angle ranging from 0 degrees to about 45 degrees.

Certain burner panel embodiments may comprise those wherein the shaped annular disk non-fluid cooled protective member has a shape selected from the group consisting of:
 (a) an annulus having a constant internal diameter d1, and an external diameter d2 that increases from one face to a second face of the annulus;
 (b) an annulus having a constant internal diameter portion of diameter d1, and an increasing internal diameter portion of diameter d3, and an external diameter d2 that increases from one face to a second face;
 (c) an annulus having a constant internal diameter d1, a constant external diameter portion of diameter d4, and a large diameter portion of diameter d5, where d4<d5.

Certain burner panel embodiments may further include a retaining member positioned about an external portion of the non-fluid cooled protective member.

Certain burner panel embodiments may comprise those wherein a distal end of the one or more fuel conduits extends a height H above a bottom surface of the non-fluid cooled protective member.

Certain burner panel embodiments may comprise those wherein the non-fluid cooled protective member comprises one or more male portions extending away from the protective member, the male portions fitting in respective female receptacles in the panel body.

Certain combustion burner panels may comprise a panel body having a first major surface defined by a lower fluid-cooled portion of the panel body, and a second major surface defined by an upper non-fluid cooled portion of the panel body, the panel body having at least one through passage extending from the first to the second major surface, the through passage diameter being greater in the lower fluid-cooled portion than in the upper non-fluid cooled portion, the panel body supporting at least one set of substantially concentric at least one inner conduit and an outer conduit, each conduit comprising proximal and distal ends, the at least one inner conduit forming a primary passage and the outer conduit forming a secondary passage between the outer conduit and the at least one inner conduit; and (b) a fluid-cooled protective member associated with each set and having connections for coolant fluid supply and return, each fluid-cooled protective member positioned adjacent at least a portion of the circumference of the outer conduit between the proximal and distal ends thereof at approximately a position of the fluid-cooled portion of the panel body.

Certain burner panel embodiments may comprise those wherein each fluid-cooled protective member is a fluid-cooled collar having an internal diameter about the same as an external diameter of the outer conduit, the fluid-cooled collar having an external diameter larger than the internal diameter.

Certain burner panel embodiments may comprise a mounting sleeve. In certain burner panel embodiments the mounting sleeve having a diameter at least sufficient to accommodate the external diameter of the fluid-cooled collar.

Certain burner panel embodiments may comprise wherein the panel body fluid-cooled portion and non-fluid-cooled portion are positioned in layers, and wherein the layers of the fluid-cooled and non-fluid-cooled portions form a seam there between, and wherein a top surface of the fluid-cooled protective member and the seam are at substantially equal distance d6 from a top surface of the non-fluid-cooled portion, and a bottom surface of the fluid-cooled protective member is below the seam a distance d7, where d6<d7.

Certain burner panel embodiments may comprise wherein the outer conduit is an oxidant conduit and extends a height h2 above the seam, and the inner conduit is a fuel conduit and extends a height h3 above the seam, wherein h2>h3.

In certain embodiments, the burner panel may include only one or more fuel conduits, or only one or more oxidant conduits. These embodiments may be paired with other panels supplying fuel or oxidant (as the case might be), the pair resulting in combustion of the fuel from one panel with the oxidant from the other panel.

In certain embodiments the burner panel may comprise a pre-disposed layer or layers of glass, ceramic, refractory, and/or refractory metal or other protective material as a protective skull over the non-fluid cooled body portion or layer. The layer or layers of protective material may or may not be the same as the material to be melted in the SCM.

In certain embodiments, the burner panel may include a pre-disposed layer or layers of glass, ceramic, refractory, and/or refractory metal or other protective material on surfaces of the through passage through the non-fluid-cooled portions of the burner panel body. The layer or layers of protective material may or may not be the same as the material to be melted in the SCM.

In certain burner panel embodiments, the protective member may be installed and/or removed from the burner panel separately from the set of conduits. In certain embodiments, the protective member of a burner panel may be removed from a position inside of an SCM, while the conduits of the same burner panel may be removed from the burner panel from outside of an SCM.

Figure 10A:
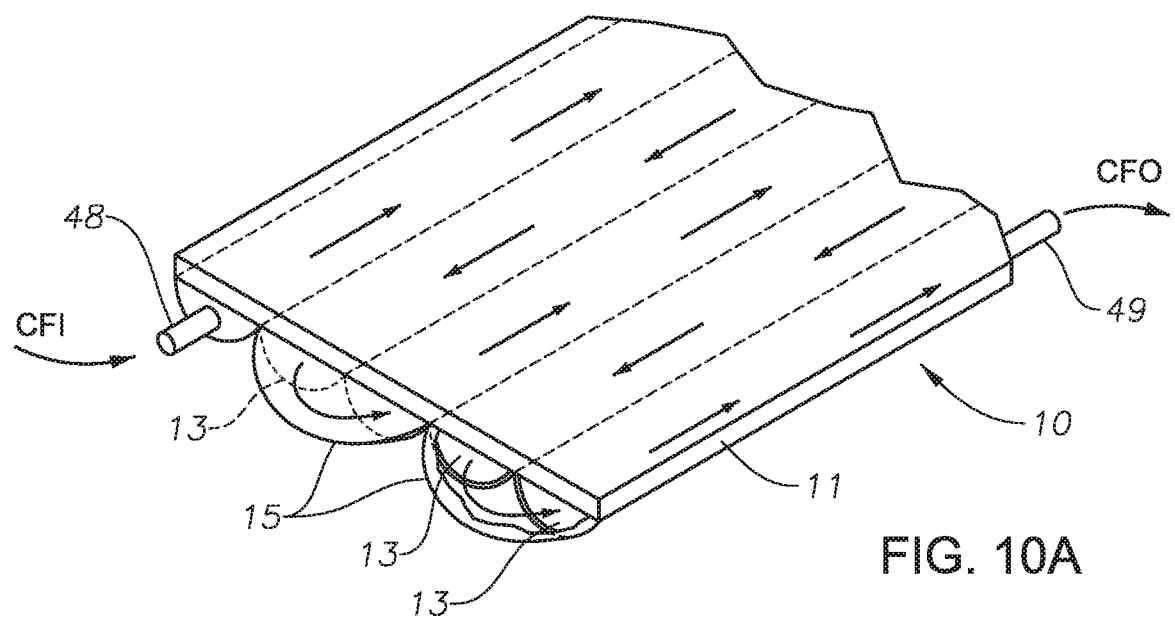
FIGS. 10A and 10B are schematic perspective and cross-sectional views, respectfully, of a fluid-cooled burner panel in accordance with the present disclosure.
Figure 10B:
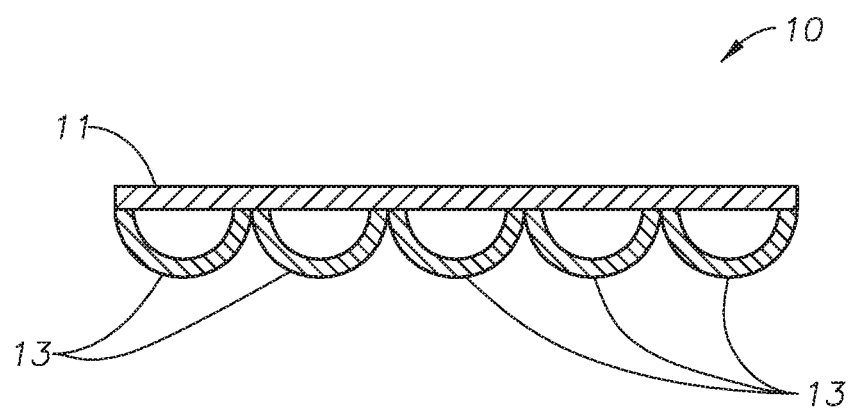

FIGS. 1, 2, 5, 6, and 7 are schematic cross-sectional views of five burner panels in accordance with the present disclosure. Embodiments 100, 200, 300, 400, and 500 illustrated schematically in FIGS. 1, 2, 5, 6, and 7, respectively each includes a panel body 2 comprised of a non-fluid-cooled portion 4 and a fluid-cooled portion 6, the fluid-cooled portion 6 including a metal (preferably steel or other high-strength material) portion 8 and a metal or other material cooling sub-portion 10. One structure of cooling sub-portion 10 is described in conjunction with schematic FIGS. 10A and 10B, illustrating a metal support plate 11 having a plurality of metal or other material conduits 13 for flow of coolant fluid there through. In the embodiment illustrated in FIGS. 10A and 10B, coolant fluid passes through one conduit 13 in one direction and returns in the next adjacent conduit 13 via elbows 15. In other embodiments, each conduit 13 may flow coolant fluid in the same direction, with the chilled coolant fluid supplied via a chilled fluid manifold, and warmed coolant fluid collected in a second manifold (not illustrated). Other arrangements are possible.

Still referring to FIGS. 1, 2, 5, 6, and 7, a seam 12 is present between non-fluid-cooled portion 4 and fluid-cooled portion 6. One or more through passages 14 are present, extending from a first major surface 16 of panel body 2 to a second major surface 18. As indicated in embodiments 100, 300, and 400 of FIGS. 1, 5, and 7, another layer or layers 20 may be present as post-formed skulls of the glass or other material being melted in the SCM, as discussed herein, and therefore are depicted schematically in phantom. In embodiments 200 and 400 of FIGS. 2 and 6, however, layer or layers 20 are pre-formed as part of the original or virgin burner panel, and are therefore depicted using solid, non-phantom lines. In cases where the burner panel includes a pre-formed protective layer or layers, second major surface 18 is formed by the top surface of pre-formed layer 20.

Referring again to FIG. 1, burner panel 100 includes an outer conduit 22, an inner conduit 24 (which may be more than one conduit) that are substantially concentric. As used herein, "substantially concentric" means that conduits 22, 24 may be concentric, or conduit 24 may be non-concentric with a longitudinal axis "L" of conduit 22 (see FIG. 5), especially if conduit 24 is comprised of more than one conduit. If conduit 24 is more than one conduit (for example 2 to 10, or 2 to 8, or 2 to 6, or 3 to 6 conduits), the conduits 24 may be centered about the longitudinal axis L of conduit 22. Conduit(s) 24 define a primary passage 26 for fuel ("F") or oxidant ("O"), while the space between outer conduit 22 and inner conduit(s) 24 defines a secondary passage 28 for fuel or oxidant. For example, during operation fuel may flow through primary passage 26 (and thus conduit(s) 24 may be referred to as "fuel conduit(s)") while oxidant may flow through secondary passage 28 (and thus conduit 22 may be referred to as an "oxidant conduit"). In other embodiments, conduit 22 may be the fuel conduit while conduit(s) 24 may be the oxidant conduit. Outer conduit 22 may be welded to metal support plate 11 (FIG. 10A) of metal support and cooling portion 10, or connected via flange or other connection, such as threaded fittings. In this way, outer and inner conduits 22, 24 may be removed from burner panel 100, such as by cutting the connection between support plate 11 and outer conduit 22, or using a torch, or unthreading.

Still referring to embodiment 100 and FIG. 1, burner panel 100 includes a plenum 30 through which outer conduit 22 may be connected to a source of F or O, and a connector 32 for connecting inner conduit 24 to a source of F or O. At a distal end 34 of outer conduit 22 is associated a non-fluid-cooled protective member 36, which may be a shaped annular disk comprised of one or more noble metals. A distal end 40 of inner conduit 24 is illustrated, as well as coolant fluid inlet and outlet connections 48, 49.

Embodiment 100 illustrated in FIG. 1 also shows diameter D4 of though passage 14 through non-fluid-cooled portion or layer 4. Diameter 14 in embodiment 100 is illustrated as increasing in the direction of flow, but this is not necessary. The diameter D4 may initially be constant, but over time during operation may broaden as illustrated due to erosion. The rate of erosion may be controlled by selection of the material of non-fluid-cooled portion 4, or at least that portion forming through passage 14. For example, through passage 14 may be formed from a controllably erodible material that erodes at a faster or slow rate than the material of non-fluid-cooled portion 4. Such materials may include ceramics such as, but not limited to, alumina and silicon nitride, refractory materials such as, but not limited to, chrome-containing or zircon-based refractory metals, and noble metals, or mixtures or combinations thereof. Skull layer 20 is depicted in phantom in embodiment 100, as in this embodiment it would be formed during operation of the SCM.

FIGS. 3A, 3B, and 3C are schematic cross-sectional views of three embodiments 110, 120, and 130 of non-fluid-cooled protective member 36 in accordance with the present disclosure, illustrating some of the variety of shapes that the shaped annular disk 36 may take. Embodiment 110 is an annulus having an internal surface 42 having diameter that is a constant magnitude of d1, and an external surface 44 having diameter d2 that increases from one face (lower or bottom face) to a second face (upper or top face) of the annulus. Embodiment 120 is an annulus having a constant internal diameter portion 42A of diameter d1, and an increasing internal diameter portion 42B of diameter d3, and an external surface 44 having a diameter d2 that increases from one face to a second face of the annulus. Embodiment 130 is an annulus having an internal surface 42 having diameter that is a constant magnitude of d1, and an external surface 44 having a constant external diameter portion 44 of diameter d4, and a large diameter heat transfer extension 46 of diameter d5, where d4<d5. In each embodiment 110, 120, and 130, the design is intended to transfer heat away from the position indicated at 50, which is the position of highest temperature of the shaped annular disk during operation. Ranges for magnitude of d1, d2, d3, d4, and d5 are provided in Table 1. It will be understood that these are approximate ranges (each number includes the word "about" before it), are not exclusive ranges, and that any range within the tabulated ranges are explicitly disclosed herein.

TABLE 1

Shaped Annular Disk Dimensions

| Dimension | Range (in.) | Pref. Range. (in.) | Range (cm) | Pref. range (cm) |
|---|---|---|---|---|
| d1 | 0.25-5.0 | 1.0-3.0 | 0.635-12.7 | 2.54-7.62 |
| d2 | 0.5-7.0 | 1.0-5.0 | 1.27-17.8 | 2.54-12.7 |
| d3 | 0.25-6.0 | 0.5-4.0 | 0.635-15.2 | 1.27-10.2 |
| d4 | 0.5-5.5 | 1.0-4.0 | 1.27-13.97 | 2.54-10.2 |
| d5 | 1.0-7.0 | 2.0-5.0 | 2.54-17.8 | 5.08-12.7 |

Figure 2:
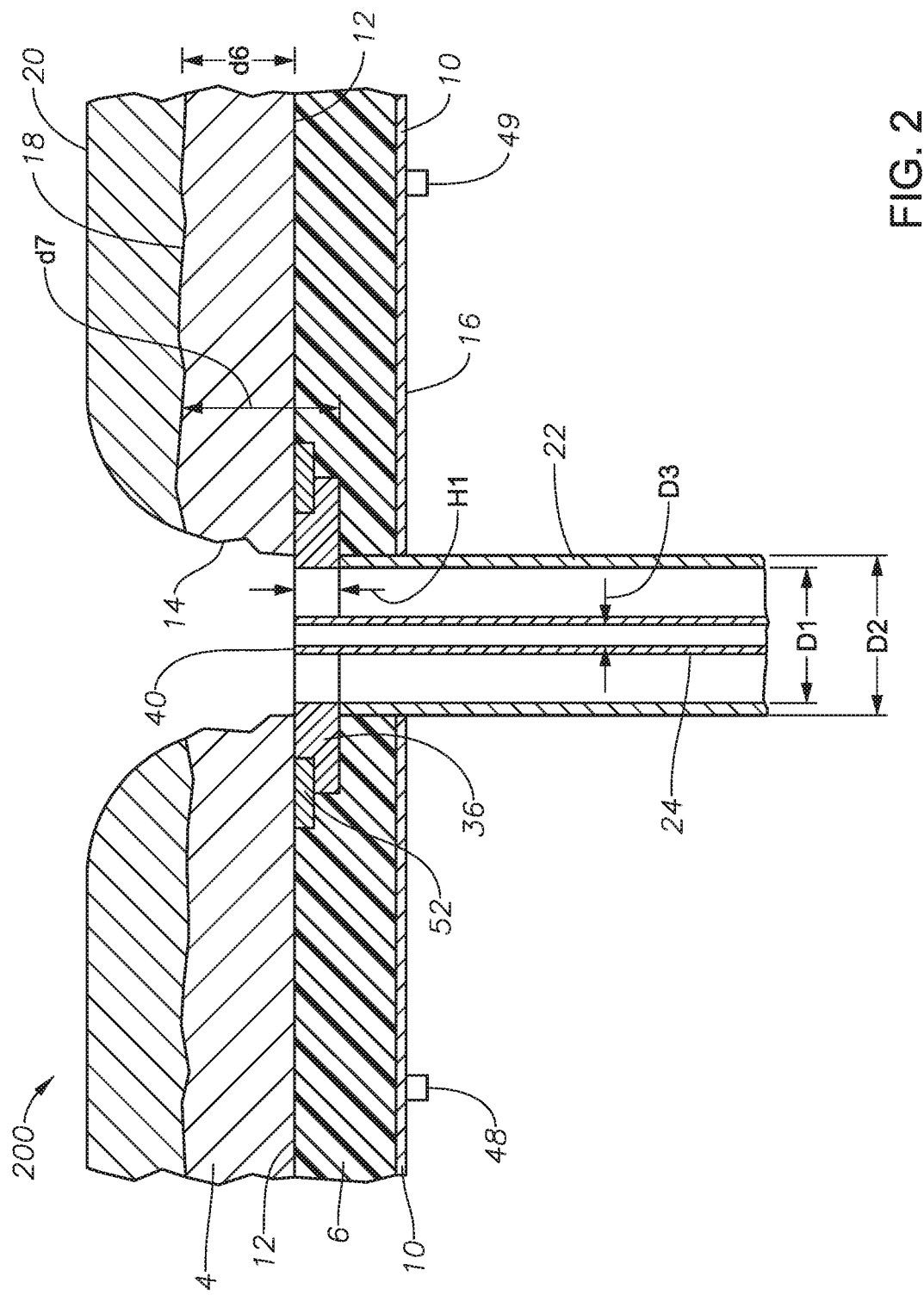

Referring now to FIG. 2, embodiment 200 includes many of the features of embodiment 100 of FIG. 1, but with the following changes. Embodiment 200 includes a pre-formed or deposited skull of protective material 20, and further illustrates more dimensions of burner panels of this disclosure. Outer conduit 22 has an inner diameter D1, and outer diameter D2, while non-fluid cooled portion 4 has a thickness d6. Further illustrated is a height H1, which is a thickness of protective member 36, and also illustrates the height of distal end 40 of inner conduit 24 above a lower surface of protective member 36. Embodiment 200 also illustrates a distance d7, which is the distance from the bottom surface of protective member 36 to a top surface of the non-fluid-cooled portion 4. Embodiment 200 also illustrates a retaining member 52 welded or brazed to protective member 36 about at least a portion of its upper periphery. Retaining member 52 may be a circumferential ring, or may be one or more male portions 54, 56 that fit into corresponding female portions 58 in fluid-cooled portion 6 as illustrated in embodiment 220 of FIG. 4. The thicknesses of pre-formed portion or layer 20 and portion 6 are not indicated in the figures, but are multiples or fractions of thickness d6 of non-fluid-cooled portion 4. The thickness of layer 20 may range from about 0.1 to about 10 times d6, or from about 0.5 to about 5 times d6; the thickness of layer 6 may range from about 0.5 to about 2 times d6, or from about 0.75 to about 1.25 times d6. Ranges for magnitude of d6, d7, H1, D1, D2, and D3 (inner diameter of inner conduit 24) are provided in Table 2. It will be understood that these are approximate ranges (each number includes the word "about" before it), are not exclusive ranges, and that any range within the tabulated ranges are explicitly disclosed herein.

TABLE 2

Burner Panel Dimensions, FIG. 2

| Dimension | Range (in.) | Pref. Range. (in.) | Range (cm) | Pref. range (cm) |
|---|---|---|---|---|
| d6 | 0.25-5.0 | 1.0-3.0 | 0.635-12.7 | 2.54-7.62 |
| d7 | 0.5-7.0 | 1.5-5.0 | 1.27-17.8 | 3.81-12.7 |
| H1 | 0.25-2.0 | 0.5-1.0 | 0.635-5.08 | 1.27-2.54 |
| D1 | 0.5-5.5 | 1.0-4.0 | 1.27-13.97 | 2.54-10.2 |
| D2 | 0.75-6.0 | 1.25-3.75 | 1.91-15.2 | 3.18-9.53 |
| D3 | 0.125-2.0 | 0.5-1.0 | 0.32-5.08 | 1.27-2.54 |

Figure 5:
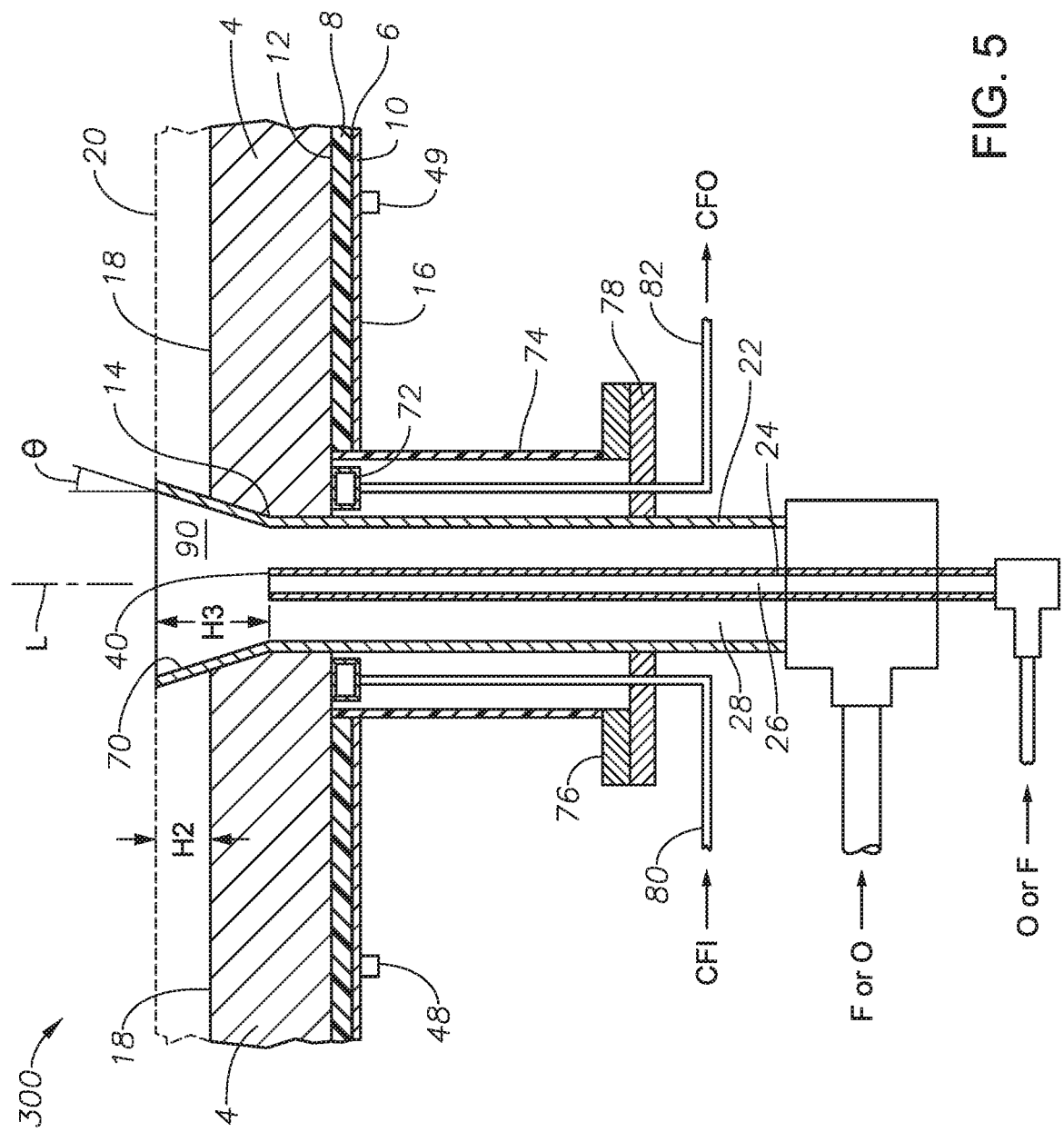
Figure 6:
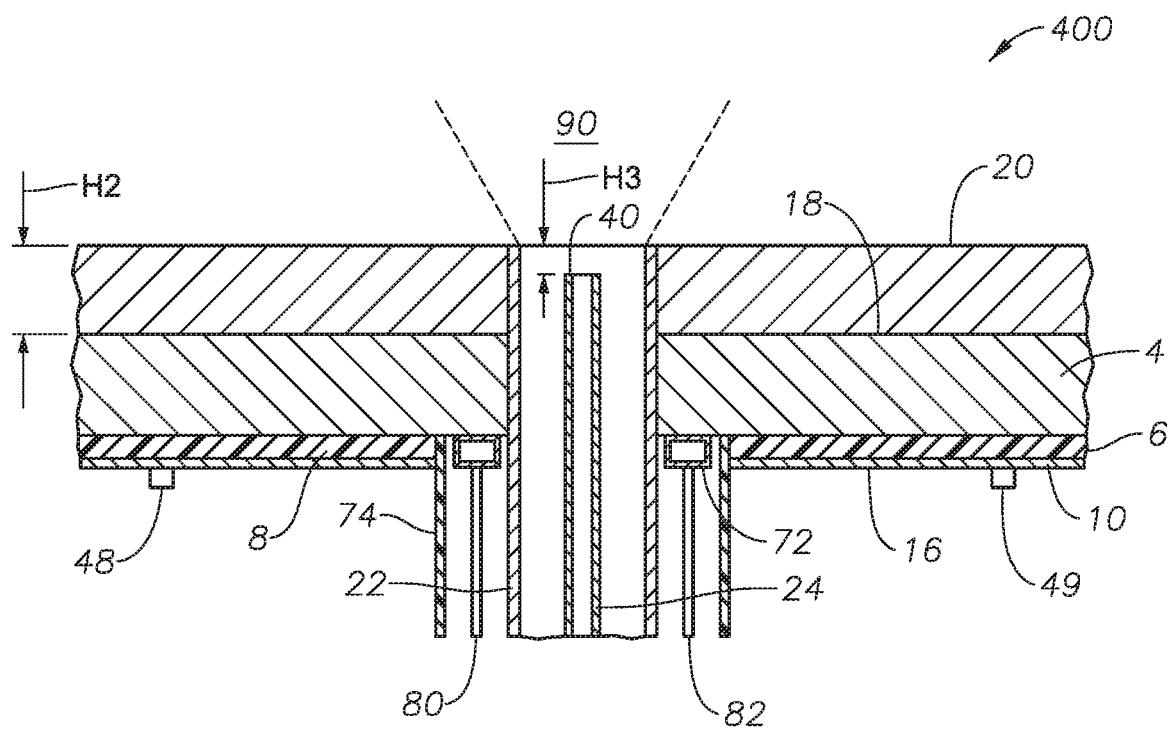
Figure 7:
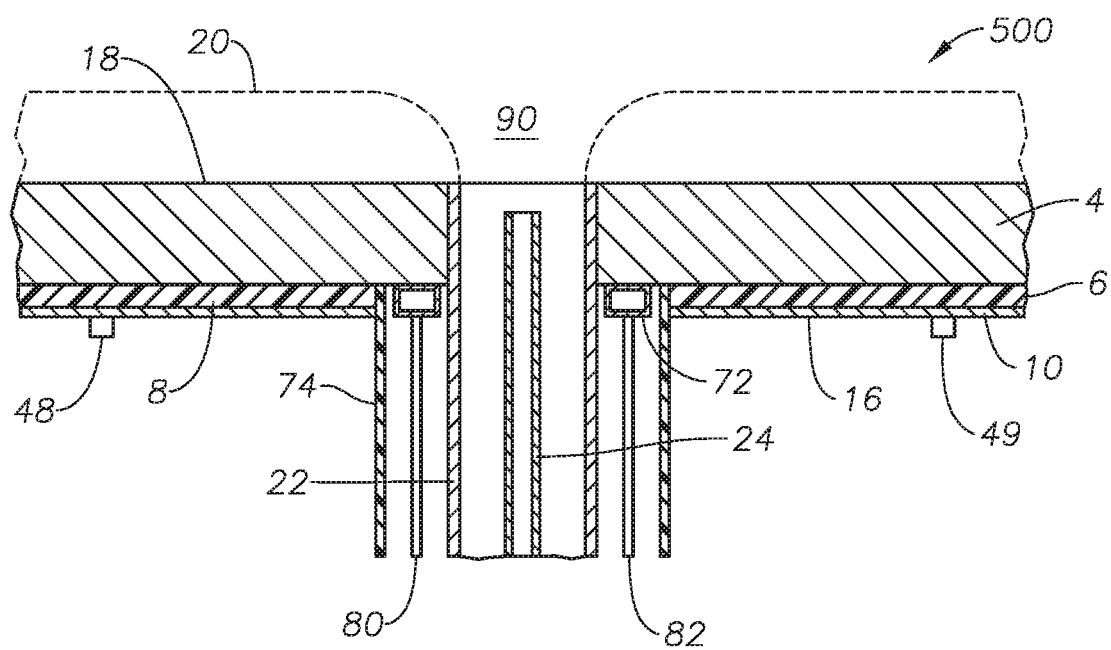

Referring now to FIGS. 5, 6, and 7, illustrated are three other embodiments 300, 400, and 500 of burner panels in accordance with the present disclosure. Embodiments 300, 400, and 500 illustrate embodiments employing a fluid-cooled protective member 72 fluidly connected to a supply of coolant fluid through one or more coolant fluid supply conduits 80, and fluidly connected to a return of coolant fluid through one or more return conduits 82. The designation "CFI" indicates "coolant fluid in" and the designation "CFO" means "coolant fluid out." Embodiment 300 includes an outer conduit 22 having an expansion nozzle 70 attached thereto, for example by welding. Alternatively, nozzle 70 and outer conduit 22 may be formed from a single ingot of metal. Embodiments 300, 400, and 500 also illustrate the use of a mounting sleeve 74, mounting sleeve first half flange 76, and second half flange 78, the flange halves held together with appropriate bolts and gaskets, not illustrated. Conduits 80, 82 pass through half flange 78. Fluid-cooled protective member 72 is preferably a hollow annulus, although the annulus need not be completely hollow; for example, there may be support structures, baffles, heat transfer structures, and other features inside of fluid-cooled protective member 72.

Still referring to FIG. 5, embodiment 300 includes a height H2, defining how far nozzle 70 extends above major surface 18. A height H3 is also illustrated, defining the distance a distal end of nozzle 70 extends above distal end of inner conduit 40, and a nozzle angle "θ", forming a non-fluid-cooled combustion region 90. In this configuration, H2<H3. Embodiment 400 illustrated schematically in FIG. 6 differs from embodiment 300 only in that the protective material skull 20 is preformed, and embodiment 400 includes no nozzle 70; in this configuration, H2>H3. Embodiment 500 illustrated schematically in FIG. 7 differs from embodiment 400 only in that the protective material skull 20 is post-formed. The structures illustrated schematically in FIGS. 5, 6, and 7 differ from known SC burners, such as disclosed in U.S. Pat. No. 7,273,583, which discloses and teaches fluid-cooled combustion chambers as an important feature. The burner panels described herein extend the operating life of the outer conduit 22, while not hindering combustion by fluid cooling of the combustion chamber. The ranges of H2, H3, and the angle α are provided in Table 3. It will be understood that these are approximate ranges (each number includes the word "about" before it), are not exclusive ranges, and that any range within the tabulated ranges are explicitly disclosed herein.

TABLE 3

Dimensions for FIG. 5

| Dimension | Range (in.) | Pref. Range. (in.) | Range (cm) | Pref. range (cm) |
|---|---|---|---|---|
| H2 | 0-5.0 | 0-3.0 | 0-12.7 | 0-7.62 |
| H3 | 0.5-7.0 | 0.5-5.0 | 1.27-17.8 | 1.27-12.7 |
| θ | 0-45 | 0-30 | — | — |

It is also noted that sleeve and flange arrangement illustrated in FIGS. 5, 6, and 7, may also be employed in the burner panels such as illustrated in FIGS. 1 and 2, embodiments 100, and 200.

Figure 8:
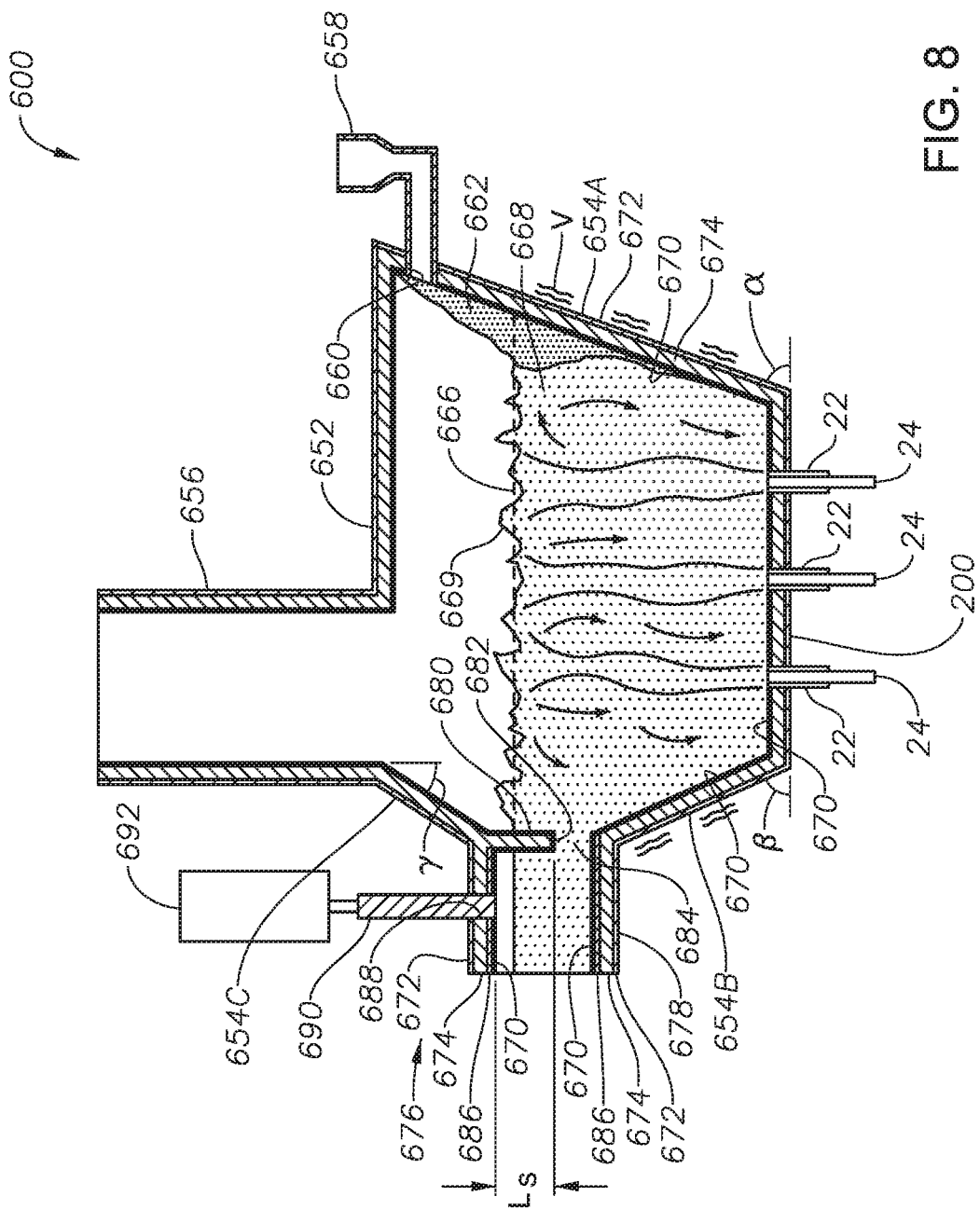
FIG. 8 is a schematic cross-sectional view of an SCM in accordance with the present disclosure.

Referring now to FIG. 8, embodiment 600 of an SCM in accordance with the present disclosure is illustrated in vertical sectional view. SCM embodiment 600 comprises a melter having a floor 200 (which may be a burner panel in accordance with the present disclosure), a roof or ceiling 652, a feed end wall 654A, a first portion of an exit end wall 654B, and a second portion of the exit end wall 654C. Feed end wall 654A and exit end wall portion 654B may form angles "α" and "β", respectively, with respect to floor 2, as indicated. Angles α and β may be the same or different, and generally may range from about 30 degrees to about 90 degrees, or from about 45 degrees to about 75 degrees. Decreasing these angles beyond these ranges may require more floor space for the melters, and/or more material of construction, both of which are generally undesirable. Increasing these angles may promote dead spaces in corners, which is also undesirable. Exit end wall portion 654C may form an angle 'γ' with respect to skimmer 680. Angle γ may be the range from 0 to about 70 degrees, or from about 30 degrees to about 75 degrees. Increasing this angle beyond these ranges may require more floor space for the melters, and/or more material of construction, both of which are generally undesirable. Decreasing this angle may promote escape of unmelted or melted material up stack 656, or deposition onto internal surfaces of stack 656, both of which are also undesirable. A pre-formed or post-formed frozen and/or highly viscous layer or layers 670 of material being melted may be formed on the inside surfaces of walls 654A, 654B, the post-formed layer or layers due to the use of fluid-cooled panels for these walls.

One or more or all of walls 654A, 654B, 654C, floor 200, and roof 652 may be comprised of a fluid-cooled metal shell 672 and a non-fluid-cooled refractory panel 674.

System embodiment 600 further includes an exhaust stack 656, and submerged combustion fuel and oxidant conduits 24, 22, in one or more burner panels making up floor 200 which create during operation a highly turbulent melt indicated at 668 having a variable surface 669. In certain embodiments, fuel and oxidant conduits 24, 22 are positioned to emit fuel and oxidant into molten material in the melting zone 668 in a fashion so that the gases combust and penetrate the melt generally perpendicularly to floor panel 200. In other embodiments, one or more fuel or oxidant conduits 24, 22 may emit fuel or oxidant into the melt at an angle to floor 200, where the angle may be more or less than 45 degrees, but in certain embodiments may be 30 degrees, or 40 degrees, or 50 degrees, or 60 degrees, or 70 degrees, or 80 degrees.

The initial raw material can be introduced into the melter of system 600 on a batch, semi-continuous or continuous basis. In some embodiments, a port 660 is arranged at end 654A of the melter through which the initial raw material is introduced by a feeder 658. Other embodiments may include a slanted or angled feed chute in which large pieces of feed material (such as basalt or other material) may be fed and optionally pre-heated by out going melter exhaust without becoming fluidized. In some embodiments a "batch blanket" 662 may form along wall 654A, as illustrated in FIG. 8. Feed port 660 may be positioned above the average glass melt level, indicated by dashed line 666. The amount of the initial raw material introduced into the melter is generally a function of, for example, the capacity and operating conditions of the melter as well as the rate at which the molten material is removed from the melter.

The initial raw material feedstock may include any material suitable for forming molten inorganic materials, such as glass, such as, for example, limestone, glass, sand, soda ash, feldspar, basalt or other rock wool forming material, and mixtures thereof. In one embodiment, a glass composition for producing glass fibers is "E-glass," which typically includes 52-56% $SiO_2$, 12-16% $Al_2O_3$, 0-0.8% $Fe_2O_3$, 16-25% CaO, 0-6% MgO, 0-10% $B_2O_3$, 0-2% $Na_2O+K_2O$, 0-1.5% $TiO_2$ and 0-1% $F_2$. Other glass compositions may be used, such as those described in assignee's published U.S. application 20080276652. The initial raw material can be provided in any form such as, for example, relatively small particles, or in the case of rock wool or mineral wool manufacture, in large pieces 5 cm or more in diameter.

As noted herein, submerged combustion burners and burner panels may produce violent turbulence of the molten inorganic material in the SCM and may result in sloshing of molten material, pulsing of combustion burners, popping of large bubbles above submerged burners, ejection of molten material from the melt against the walls and ceiling of melter, and the like. Frequently, one or more of these phenomena may result in undesirably short life of temperature sensors and other components used to monitor a submerged combustion melter's operation, making monitoring difficult, and use of signals from these sensors for melter control all but impossible for more than a limited time period. Processes and systems of the present disclosure may include indirect measurement of melt temperature in the melter itself, as disclosed in assignee's U.S. Pat. No. 9,096,453, using one or more thermocouples for monitoring and/or control of the melter, for example using a controller. A signal may be transmitted by wire or wirelessly from a thermocouple to a controller, which may control the melter by adjusting any number of parameters, for example feed rate of feeder 658 may be adjusted through a signal, and one or more of fuel and/or oxidant conduits 24, 22 may be adjusted via a signal, it being understood that suitable transmitters and actuators, such as valves and the like, are not illustrated for clarity.

Referring again to FIG. 8, system embodiment 600 includes a melter exit structure 676 for discharging the molten glass or similar material. Melter exit structure 676 is positioned generally downstream of melter exit ends 654B, 654C as illustrated of FIG. 8, and may fluidly and mechanically connect the melter vessel to a molten material conditioning channel, or other channel or structure (not illustrated). Melter exit structure 676 comprises a fluid-cooled transition channel 678, having generally rectangular cross-section in embodiment 600, although any other cross-section would suffice, such as hexagonal, trapezoidal, oval, circular, and the like. Regardless of cross-sectional shape, fluid-cooled transition channel 678 is configured to form a frozen layer or highly viscous layer, or combination thereof, of material being melted on inner surfaces of fluid-cooled transition channel 678 and thus protect melter exit structure 676 from the mechanical energy imparted from the melter vessel to melter exit structure 676. Melter exit structure 676 may in certain embodiments comprise an essentially rectangular, fluid-cooled, ceramic or metallic box having a length, a width, a height. In these embodiments, length may range from about 5 to about 50 percent, or from about 10 to about 40 percent, of the entire length of the melter apparatus. The width of melt exit structure 676 may be the same as the width of the melter apparatus, or may be less or more than the width of the melter apparatus. The height may range from about 5 to about 50 percent, or from about 10 to about 40 percent, of the entire height of the melter apparatus, measured from floor 200 to ceiling 652. Melter length, width and height depend primarily on the amount of raw material to be fed, the amount of molten material to be produced, and the desired throughputs mentioned herein.

A fluid-cooled skimmer 680 may be provided, extending downward from the ceiling of the melter vessel and positioned upstream of fluid-cooled transition channel 678. Fluid-cooled skimmer 680 has a lower distal end 682 extending a distance $L_s$ ranging from about 1 inch to about 12 inches (from about 2.5 cm to about 30 cm) below the average melt level 666, which may be from about 0.2 to about 0.8, or from about 0.25 to about 0.75 times the height of 676. Fluid-cooled skimmer 680 may be configured to form a frozen layer or highly viscous layer, or combination thereof, of material being melted on its outer surfaces. Skimmer lower distal end 682 defines, in conjunction with a lower wall of melter exit structure 676, a throat 684 of the melter vessel, throat 684 configured to control flow of molten glass or other material from the melter vessel into melter exit structure 676. Preferably, throat 684 is arranged below average melt level 666. Molten material can be removed from melter exit structure 676 on a batch, semi-continuous basis or continuous basis. In an exemplary embodiment, the molten material continuously flows through throat 684 and generally horizontally through melter exit structure 676, and is removed continuously from melter exit structure 676 to a conditioning channel (not illustrated). Thereafter, the molten material can be processed by any suitable known technique, for example, a process for forming glass or other fibers.

Certain embodiments may include an overlapping refractory material layer 686 on at least the inner surface of fluid-cooled transition channel 678 that are exposed to molten material. In certain embodiments the overlapping refractory material may comprise a seamless insert of dense chrome, molybdenum, or other dense ceramic or metallic material. The dense chrome or other refractory material may be inserted into the melter exit structure and may provide a seamless transition form the melter vessel to a conditioning channel (not illustrated).

Another optional feature of system embodiment 600 is the provision of a fluid-cooled dam opening 688 in the upper wall or ceiling of melt exit structure 676. Dam opening 688 accommodates a movable, fluid-cooled dam 690, which is illustrated schematically in FIG. 8 in a retracted position. Dam 690 may be manipulated by a prime mover 692, such as one or more motors, jack screws, or the like. Fluid-cooled dam 690 comprises dimensions allowing the dam to be extended an entire distance from top to bottom of fluid-cooled transition channel 678 and completely isolate the melting zone of the melter vessel from the conditioning channel.

FIG. 9 is a schematic logic diagram of a method of melting non-metallic inorganic materials in accordance with the present disclosure. In embodiment 700, the method comprises feeding the feedstock into a submerged combustion melter comprising a combustion burner panel comprising a panel body having a first major surface defined by a lower fluid-cooled portion of the panel body, and a second major surface defined by an upper non-fluid cooled portion of the panel body, the panel body having at least one through passage extending from the first to the second major surface, the panel body supporting at least one set of substantially concentric at least one inner conduit and an outer conduit in the through passage, each conduit comprising proximal and distal ends, the at least one inner conduit forming a primary passage and the outer conduit forming a secondary passage between the outer conduit and the at least one inner conduit; and a non-fluid cooled protective member associated with each set, each non-fluid cooled protective member supported at least partially internally of the panel body and positioned at the distal end of the outer conduit of each set (box 702); and melting the feedstock (box 704). Alternatively, another method of the disclosure comprises methods similar to that of embodiment 700, but the SCM comprises one or more burner panels comprising one or more fluid-cooled protective members.

Melter apparatus in accordance with the present disclosure may also comprise one or more wall-mounted submerged combustion burners, and/or one or more roof-mounted burners (not illustrated). Roof-mounted burners may be useful to pre-heat the melter apparatus melting zones, and serve as ignition sources for one or more submerged combustion burners and/or burner panels. Melter apparatus having only wall-mounted, submerged-combustion burners or burner panels are also considered within the present disclosure. Roof-mounted burners may be oxy-fuel burners, but as they are only used in certain situations, are more likely to be air/fuel burners. Most often they would be shut-off after pre-heating the melter and/or after starting one or more submerged combustion burners. In certain embodiments, if there is a possibility of carryover of batch particles to the exhaust, one or more roof-mounted burners could be used to form a curtain to prevent particulate carryover. In certain embodiments, all submerged combustion burners and burner panels are oxy/fuel burners or oxy-fuel burner panels (where "oxy" means oxygen, or oxygen-enriched air, as described earlier), but this is not necessarily so in all embodiments; some or all of the submerged combustion burners or burner panels may be air/fuel burners. Furthermore, heating may be supplemented by electrical heating in certain embodiments, in certain melter zones.

Suitable materials for glass-contact refractory, which may be present in SC melters and downstream flow channels, and refractory panel bodies of burner panels, include fused zirconia ($ZrO_2$), fused cast AZS (alumina-zirconia-silica), rebonded AZS, or fused cast alumina ($Al_2O_3$). The melter geometry and operating temperature, burner body panel geometry, and type of glass or other product to be produced, may dictate the choice of a particular material, among other parameters.

The term "fluid-cooled" means use of a coolant fluid (heat transfer fluid) to transfer heat away from the burner panel. Heat transfer fluids may be any gaseous, liquid, slurry, or some combination of gaseous, liquid, and slurry compositions that functions or is capable of being modified to function as a heat transfer fluid. Gaseous heat transfer fluids may be selected from air, including ambient air and treated air (for example, air treated to remove moisture), inorganic gases, such as nitrogen, argon, and helium, organic gases such as fluoro-, chloro- and chlorofluorocarbons, including perfluorinated versions, such as tetrafluoromethane, and hexafluoroethane, and tetrafluoroethylene, and the like, and mixtures of inert gases with small portions of non-inert gases, such as hydrogen. Heat transfer liquids and slurries may be selected from liquids and slurries that may be organic, inorganic, or some combination thereof, for example, water, salt solutions, glycol solutions, oils and the like. Other possible heat transfer fluids include steam (if cooler than the expected glass melt temperature), carbon dioxide, or mixtures thereof with nitrogen. Heat transfer fluids may be compositions comprising both gas and liquid phases, such as the higher chlorofluorocarbons.

Certain SCMs of this disclosure may comprise one or more non-submerged burners. Suitable non-submerged combustion burners may comprise a fuel inlet conduit having an exit nozzle, the conduit and nozzle inserted into a cavity of a ceramic burner block, the ceramic burner block in turn inserted into either the SCM roof or the SCM wall structure, or both the SCM roof and SCM wall structure. Downstream flow channels may also comprise one or more non-submerged burners.

In certain SCMs, one or more fuel and/or oxidant conduits in the SCM and/or flow channel(s) downstream thereof may be adjustable with respect to direction of flow of the fuel or oxidant or both. Adjustment may be via automatic, semi-automatic, or manual control. Certain system embodiments may comprise a mount that mounts the fuel or oxidant conduit in a burner panel of the SCM and/or flow channel comprising a refractory, or refractory-lined ball joint. Other mounts may comprise rails mounted in slots in the wall or roof. In yet other embodiments the fuel and/or oxidant conduits may be mounted outside of the melter or channel, on supports that allow adjustment of the fuel or oxidant flow direction. Useable supports include those comprising ball joints, cradles, rails, and the like.

Certain SCMs and method embodiments of this disclosure may include fluid-cooled panels such as disclosed in assignee's U.S. Pat. No. 8,769,992. Certain systems and processes of the present disclosure may utilize measurement and control schemes such as described in Applicant's U.S. Pat. No. 9,096,453, and/or feed batch densification systems and methods as described in assignee's co-pending U.S. patent application Ser. No. 13/540,704, filed Jul. 3, 2012. Certain SCMs and processes of the present disclosure may utilize devices for delivery of treating compositions such as disclosed in assignee's U.S. Pat. No. 8,973,405.

Certain SCMs and process embodiments of this disclosure may be controlled by one or more controllers. For example, combustion (flame) temperature may be controlled by monitoring one or more parameters selected from velocity of the fuel, velocity of the primary oxidant, mass and/or volume flow rate of the fuel, mass and/or volume flow rate of the primary oxidant, energy content of the fuel, temperature of the fuel as it enters the burner panel, temperature of the primary oxidant as it enters the burner panel, temperature of the effluent, pressure of the primary oxidant entering the burner panel, humidity of the oxidant, burner panel geometry, combustion ratio, and combinations thereof. Certain SCMs and processes of this disclosure may also measure and/or monitor feed rate of batch or other feedstock materials, such as rock wool or mineral wool feedstock, glass batch, cullet, mat or wound roving and treatment compositions, mass of feed, and use these measurements for control purposes.

Oxidant and fuel conduits of burner panels of the present disclosure may be comprised of metal, ceramic, ceramic-lined metal, or combination thereof. Suitable metals include carbon steels, stainless steels, for example, but not limited to, 306 and 316 steel, as well as titanium alloys, aluminum alloys, and the like. High-strength materials like C-110 and C-125 metallurgies that are NACE qualified may be employed for burner body components. (As used herein, "NACE" refers to the corrosion prevention organization formerly known as the National Association of Corrosion Engineers, now operating under the name NACE International, Houston, Tex.) Use of high strength steel and other high strength materials may significantly reduce the conduit wall thickness required, reducing weight of the conduits and/or space required for conduits.

Protection members of burner panels of the present disclosure may comprise noble metals and/or other exotic corrosion and/or fatigue-resistant materials, such as platinum (Pt), ruthenium (Ru), rhodium (Rh), palladium (Pd), silver (Ag), osmium (Os), iridium (Ir), and gold (Au); alloys of two or more noble metals; and alloys of one or more noble metals with a base metal. In certain embodiments the protective member may comprise an 80 wt. percent platinum/20 wt. percent rhodium alloy attached to the outer base metal conduit using brazing, welding or soldering of certain regions, as further explained in assignee's International Application No. PCT/US2013/042182 filed May 22, 2013 (WO2014-189504A1).

When in alloyed form, alloys of two or more noble metals may have any range of noble metals. For example, alloys of two noble metals may have a range of about 0.01 to about 99.99 percent of a first noble metal and 99.99 to 0.01 percent of a second noble metal. Any and all ranges in between 0 and 99.99 percent first noble metal and 99.99 and 0 percent second noble metal are considered within the present disclosure, including 0 to about 99 percent of first noble metal; 0 to about 98 percent; 0 to about 97 percent; 0 to about 96; 0 to about 95; 0 to about 90; 0 to about 80; 0 to about 75; 0 to about 70; 0 to about 65; 0 to about 60; 0 to about 55; 0 to about 50; 0 to about 45, 0 to about 40; 0 to about 35; 0 to about 30; 0 to about 25; 0 to about 20; 0 to about 19; 0 to about 18; 0 to about 17; 0 to about 16; 0 to about 15; 0 to about 14; 0 to about 13; 0 to about 12; 0 to about 11; 0 to about 10; 0 to about 9; 0 to about 8; 0 to about 7; 0 to about 6; 0 to about 5; 0 to about 4; 0 to about 3; 0 to about 2; 0 to about 1; and 0 to about 0.5 percent of a first noble metal; with the balance comprising a second noble metal, or consisting essentially of (or consisting of) a second noble metal (for example with one or more base metals present at no more than about 10 percent, or no more than about 9 percent base metal, or no more than about 8, or about 7, or about 6, or about 5, or about 4, or about 3, or about 2, or no more than about 1 percent base metal).

In certain noble metal alloy embodiments comprising three or more noble metals, the percentages of each individual noble metal may range from equal amounts of all noble metals in the composition (about 33.33 percent of each), to compositions comprising, or consisting essentially of, or consisting of 0.01 percent of a first noble metal, 0.01 percent of a second noble metal, and 99.98 percent of a third noble metal. Any and all ranges in between about 33.33 percent of each, and 0.01 percent of a first noble metal, 0.01 percent of a second noble metal, and 99.98 percent of a third noble metal, are considered within the present disclosure.

The choice of a particular material is dictated among other parameters by the chemistry, pressure, and temperature of fuel and oxidant used and type of melt to be produced. The skilled artisan, having knowledge of the particular application, pressures, temperatures, and available materials, will be able design the most cost effective, safe, and operable burner panels for each particular application without undue experimentation.

The terms "corrosion resistant" and "fatigue resistant" as used herein refer to two different failure mechanisms that may occur simultaneously, and it is theorized that these failure mechanisms may actually influence each other in profound ways. Preferably, burner panels will have a satisfactory service life of at least 12 months under conditions existing in a continuously operating SCM. As used herein the SCM may comprise a floor, a roof, and a sidewall structure connecting the floor and roof defining an internal space, at least a portion of the internal space comprising a melting zone, and one or more combustion burner panels of this disclosure in either the floor, the roof, or the sidewall structure, or any two or more of these, producing combustion gases and configured to emit the combustion gases from a position under a level of, and positioned to transfer heat to and produce, a turbulent molten mass of glass containing bubbles in the melting zone.

The total quantities of fuel and oxidant used by burner panels of the present disclosure may be such that the flow of oxygen may range from about 0.9 to about 1.2 of the theoretical stoichiometric flow of oxygen necessary to obtain the complete combustion of the fuel flow. Another expression of this statement is that the combustion ratio may range from about 0.9 to about 1.2.

The velocity of the fuel in the various burner panel embodiments of the present disclosure depends on the burner panel geometry used, but generally is at least about 15 meters/second (m/s). The upper limit of fuel velocity depends primarily on the desired penetration of flame and/or combustion products into the glass melt and the geometry of the burner panel; if the fuel velocity is too low, the flame temperature may be too low, providing inadequate temperature in the melter, which is not desired, and if the fuel flow is too high, flame and/or combustion products might impinge on a melter wall or roof, or cause carryover of melt into the exhaust, or be wasted, which is also not desired. Baffles may be provided extending from the roof, and/or in the melter exhaust stack, or transition region between the melter and stack, in order to safeguard against this. Similarly, oxidant velocity should be monitored so that flame and/or combustion products do not impinge on an SCM wall or roof, or cause carryover of melt into the exhaust, or be wasted. Oxidant velocities depend on fuel flow rate and fuel velocity, but in general should not exceed about 200 ft/sec at 400 scfh flow rate.

A combustion process control scheme may be employed. A master controller may be employed, but the disclosure is not so limited, as any combination of controllers could be used. The controller may be selected from PI controllers, PID controllers (including any known or reasonably foreseeable variations of these), and may compute a residual equal to a difference between a measured value and a set point to produce an output to one or more control elements. The controller may compute the residual continuously or non-continuously. Other possible implementations of the disclosure are those wherein the controller comprises more specialized control strategies, such as strategies selected from feed forward, cascade control, internal feedback loops, model predictive control, neural networks, and Kalman filtering techniques.

The term "control", used as a transitive verb, means to verify or regulate by comparing with a standard or desired value. Control may be closed loop, feedback, feed-forward, cascade, model predictive, adaptive, heuristic and combinations thereof. The term "controller" means a device at least capable of accepting input from sensors and meters in real time or near-real time, and sending commands directly to burner panel control elements, and/or to local devices associated with burner panel control elements able to accept commands. A controller may also be capable of accepting input from human operators; accessing databases, such as relational databases; sending data to and accessing data in databases, data warehouses or data marts; and sending information to and accepting input from a display device readable by a human. A controller may also interface with or have integrated therewith one or more software application modules, and may supervise interaction between databases and one or more software application modules.

The phrase "PID controller" means a controller using proportional, integral, and derivative features. In some cases the derivative mode may not be used or its influence reduced significantly so that the controller may be deemed a PI controller. It will also be recognized by those of skill in the control art that there are existing variations of PI and PID controllers, depending on how the discretization is performed. These known and foreseeable variations of PI, PID and other controllers are considered within the disclosure.

The controller may utilize Model Predictive Control (MPC). MPC is an advanced multivariable control method for use in multiple input/multiple output (MIMO) systems. MPC computes a sequence of manipulated variable adjustments in order to optimise the future behavior of the process in question. It may be difficult to explicitly state stability of an MPC control scheme, and in certain embodiments of the present disclosure it may be necessary to use nonlinear MPC. In so-called advanced control of various systems, PID control may be used on strong mono-variable loops with few or nonproblematic interactions, while one or more networks of MPC might be used, or other multivariable control structures, for strong interconnected loops. Furthermore, computing time considerations may be a limiting factor. Some embodiments may employ nonlinear MPC.

A feed forward algorithm, if used, will in the most general sense be task specific, meaning that it will be specially designed to the task it is designed to solve. This specific design might be difficult to design, but a lot is gained by using a more general algorithm, such as a first or second order filter with a given gain and time constants.

Although only a few exemplary embodiments of this disclosure have been described in detail above, those skilled in the art will readily appreciate that many modifications are possible in the exemplary embodiments without materially departing from the novel teachings and advantages of this disclosure. Accordingly, all such modifications are intended to be included within the scope of this disclosure as defined in the following claims. In the claims, no clauses are intended to be in the means-plus-function format allowed by 35 U.S.C. § 112, Section F, unless "means for" is explicitly recited together with an associated function. "Means for" clauses are intended to cover the structures, materials, and/or acts described herein as performing the recited function and not only structural equivalents, but also equivalent structures.

What is claimed is:

1. A combustion burner panel comprising:
   (a) a panel body having a first major surface defined by a lower fluid-cooled portion of the panel body, and a second major surface defined by an upper non-fluid cooled portion of the panel body, the panel body having at least one through passage extending from the first to the second major surface, the through passage diameter being greater in the lower fluid-cooled portion than in the upper non-fluid cooled portion, the panel body supporting at least one set of substantially concentric at least one inner conduit and an outer conduit, each conduit comprising proximal and distal ends, the at least one inner conduit forming a primary passage and the outer conduit forming a secondary passage between the outer conduit and the at least one inner conduit; and
   (b) a fluid-cooled protective member associated with each set and having connections for coolant fluid supply and return, each fluid-cooled protective member positioned adjacent at least a portion of the circumference of the outer conduit between the proximal and distal ends thereof at approximately a position of the fluid-cooled portion of the panel body.

2. The burner panel of claim 1 wherein each fluid-cooled protective member is a fluid-cooled collar having an internal diameter about the same as an external diameter of the outer conduit, the fluid-cooled collar having an external diameter larger than the internal diameter.

3. The burner panel of claim 1 comprising a mounting sleeve, the mounting sleeve having a diameter at least sufficient to accommodate the external diameter of the fluid-cooled collar.

4. The burner panel of claim 1 wherein the panel body fluid-cooled portion and non-fluid-cooled portion are positioned in layers, and wherein the layers of the fluid-cooled and non-fluid-cooled portions form a seam there between, and wherein a top surface of the fluid-cooled protective member and the seam are at substantially equal distance d6 from a top surface of the non-fluid-cooled portion, and a bottom surface of the fluid-cooled protective member is below the seam a distance d7, where d6<d7.

5. The burner panel of claim 4 wherein the outer conduit is an oxidant conduit and extends a height h2 above the seam, and the inner conduit is a fuel conduit and extends a height h3 above the seam, wherein h2>h3.

6. A submerged combustion melter including one or more burner panels of claim 1.

7. A method of melting non-metallic inorganic feedstock using a submerged combustion melter, the method comprising (a) feeding the feedstock into the submerged combustion melter of claim 6, and (b) melting the feedstock.

* * * * *